US012631906B2

(12) United States Patent
Wolff et al.

(10) Patent No.: US 12,631,906 B2
(45) Date of Patent: May 19, 2026

(54) SPECTACLE LENS AND METHOD FOR MANUFACTURING A SPECTACLE LENS

(71) Applicant: Carl Zeiss Vision International GmbH, Aalen (DE)

(72) Inventors: Christian Wolff, Aalen (DE); Marc Ellenrieder, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/654,085

(22) Filed: May 3, 2024

(65) Prior Publication Data

US 2024/0295756 A1 Sep. 5, 2024

Related U.S. Application Data

(63) Continuation of application No. PCT/EP2022/080477, filed on Nov. 2, 2022.

(30) Foreign Application Priority Data

Nov. 8, 2021 (EP) .................................... 21206970

(51) Int. Cl.
*G02C 7/10* (2006.01)

(52) U.S. Cl.
CPC .................................... *G02C 7/102* (2013.01)

(58) Field of Classification Search
CPC ........................ G02C 7/102; G02B 2027/0178
USPC ............................ 359/241, 243; 351/159.61
See application file for complete search history.

(56) References Cited

U.S. PATENT DOCUMENTS

| | | | | |
|---|---|---|---|---|
| 4,931,221 | A * | 6/1990 | Heller | C08K 5/1545 549/381 |
| 5,628,935 | A * | 5/1997 | Hughes | G03C 1/685 524/110 |
| 6,926,405 | B2 * | 8/2005 | Ambler | G02B 5/23 351/159.63 |
| 10,444,552 | B2 * | 10/2019 | Ye | G02F 1/0541 |

(Continued)

FOREIGN PATENT DOCUMENTS

| | | | |
|---|---|---|---|
| CN | 102906215 | A | 1/2013 |
| CN | 110234642 | A | 9/2019 |

(Continued)

OTHER PUBLICATIONS

Barten, "Formula for the contrast sensitivity of the human eye," Proc. SPIE 5294 Image Quality and System Performance, Dec. 2003.

(Continued)

*Primary Examiner* — Zachary W Wilkes
(74) *Attorney, Agent, or Firm* — Qubit IP, PLLC

(57) ABSTRACT

A spectacle lens contains a composition exhibiting a negative photochromic property and a composition exhibiting a positive photochromic property. Moreover, a method for manufacturing a spectacle lens is disclosed, wherein the method includes the following method steps: S1: providing a spectacle lens substrate; S2: arranging a composition exhibiting a negative photochromic property on a surface of the spectacle lens substrate; and S3: arranging a composition exhibiting a positive photochromic property on a surface of the spectacle lens substrate and/or incorporating a composition exhibiting a positive photochromic property into the spectacle lens substrate.

15 Claims, 7 Drawing Sheets

(56) References Cited

U.S. PATENT DOCUMENTS

| | | | | |
|---|---|---|---|---|
| 10,696,898 | B2 * | 6/2020 | Katoh | C09B 23/04 |
| 11,543,570 | B1 * | 1/2023 | Sears | G02B 1/111 |
| 2010/0232003 | A1 * | 9/2010 | Baldy | G02C 7/12 359/243 |
| 2012/0183810 | A1 | 7/2012 | Chopra | |
| 2013/0102775 | A1 | 4/2013 | Horino et al. | |
| 2017/0090194 | A1 * | 3/2017 | Hayes | G02B 27/0101 |
| 2018/0164613 | A1 * | 6/2018 | Ye | G02F 1/0541 |
| 2019/0382654 | A1 * | 12/2019 | Katoh | C09K 9/02 |
| 2020/0201079 | A1 | 6/2020 | Liang et al. | |

FOREIGN PATENT DOCUMENTS

| | | | |
|---|---|---|---|
| JP | H0820080 | A | 1/1996 |
| JP | 2000314088 | A | 11/2000 |
| JP | 2010270163 | A | 12/2010 |
| JP | 2012-017442 | A | 1/2012 |
| JP | 2013-545803 | A | 12/2013 |
| JP | 2018-517922 | A | 7/2018 |
| WO | 9931081 | A1 | 6/1999 |
| WO | 2016187772 | A1 | 12/2016 |
| WO | 2018/143239 | A1 | 8/2018 |

OTHER PUBLICATIONS

Lingelbach et al., "Contrast Enhancing Filters in Ski Sports," Journal of ASTM International, vol. 2, No. 1, pp. 1 to 8, Jan. 2005.

Yamaguchi et al., Fast Negative Photochromism of 1, 1'-Binaphthyl-Bridged Phenoxyl-Imidazolyl Radical Complex, Journal of the American Chemical Society, vol. 138, No. 3, pp. 906 to 913, Jan. 2016.

Nakatani et al., "Introduction: Organic Photochromic Molecules," Photochromic Materials: Preparation, Properties and Applications, Editor Zhang et al., Wiley-VCH Verlag Gmbh & Co. KG, Jun. 2016.

Moldenhauer et al., "Water-Soluble Spiropyrans with Inverse Photochromism and Their Photoresponsive Electrostatic Self-Assembly," Chemistry—A European Journal, vol. 23, No. 16, pp. 3966 to 3978, Mar. 2017.

Gurke et al., "Efficient Light-Induced pKa Modulation Coupled to Base-Catalyzed Photochromism," Angewandte Chemie International Edition, vol. 57, No. 17, pp. 4797 to 4801, Apr. 2018.

Feeney et al., "Tuning the Negative Photochromism of Water-Soluble Spiropyran Polymers," Macromolecules, vol. 51, No. 20, pp. 8027 to 8037, Oct. 2018.

Alghazwat et al., "Red-light responsive metastable-state photoacid," Dyes and Pigments, vol. 171, pp. 1 to 5, Dec. 2019.

Sarkar et al., "Electronic Excited States and UV-Vis Absorption Spectra of the Dihydropyrene/Cyclophanediene Photochromic Couple: a Theoretical Investigation," The Journal of Physical Chemistry A, vol. 124, No. 8, pp. 1567 to 1579, Feb. 2020.

Funasako et al., "Synthesis, Photochromic Properties, and Crystal Structures of Salts Containing a Pyridinium-Fused Spiropyran: Positive and Negative Photochromism in the Solution and Solid State," Journal of Physical Chemistry B, vol. 124, No. 33, pp. 7251-7257, Jul. 2020.

Hou et al., "Proton-Gated Ring-Closure of a Negative Photochromic Azulene-Based Diarylethene," Angewandte Chemie International Edition, vol. 59, No. 42, pp. 18532-18536, Oct. 2020.

Nemoto et. al., "Negative photochromism of a blue cyanine dye," Chemical Communications, vol. 56, No. 96, pp. 15205 to 15207, Nov. 2020.

Homepage of Bruce Lindbloom, available at the url http://www.brucelindbloom.com/index.html?Eqn_DeltaE_CMC.html (last accessed May 2, 2024).

European Search Report issued in EP 21206970.2, to which this application claims priority, mailed Apr. 26, 2022.

International Search Report and Written Opinion issued in PCT/EP2022/080477, to which this application claims priority, mailed Feb. 17, 2023.

International Preliminary Report on Patentability issued in PCT/EP2022/080477, to which this application claims priority, mailed Dec. 19, 2023.

Industrial Norm "Ophthalmic optics—Uncut finished spectacle lenses—Part 3: Transmittance specifications and test methods (ISO 8980-3)," English version ISO 8980-3, Oct. 1, 2003.

Industrial Norm "Optics and photonics—Spectral brands (ISO 20473:2007-04)," English version ISO 20473:2007-04, Apr. 15, 2007.

Industrial Norm "Colorimetry—Part 7: Measuring conditions for object colours (DIN 5033-7:2014-10)," German version DIN 5033-7, Oct. 2014 (english machine translation attached).

Industrial Norm "Ophthalmic optics—Spectacle lenses—Vocabulary (ISO 13666:2019)," English version EN ISO 13666:2019, Dec. 2019.

Industrial Norm "Colorimetry—Part 1: CIE standard colorimetric observers (ISO/CIE 11664:1:2019)," German version EN ISO/CIE 11664-1:2019, Mar. 2020 (english machine translation attached).

Industrial Norm "Colorimetry—Part 2: CIE stadard illuminants (ISO 11664-2:2022)" German version EN ISO/CIE 1164-2:2022, Dec. 2022 (english machine translation attached).

Office Action by the Japanese Patent Office (JPO) issued in JP 2024-526740, which is a counterpart hereof, mailed on Sep. 24, 2024, and English translation thereof.

Office Action by the Japanese Patent Office (JPO) issued in JP 2024-526740, which is a counterpart hereof, mailed on Feb. 4, 2025, and English-language translation thereof.

Moldenhauer et al., "Water-Soluble Spiropyrans with Inverse Photochromism and Their Photoresponsive Electrostratic Self-Assembly," Chemistry—A European Journal, vol. 23, No. 16, pp. 3966-3978, Mar. 2017.

Industrial Norm "Colorimetry (DIN EN ISO/CIE 11664-4:2019—Part 4: CIE 1976 L*a*b* Colour space)," English version ISO/CIE 11664-4, Jun. 2019.

Hou et al., "Proton-gated ring-closure of a negative photochromic azulene-based diarylethene," Angewandte Chemie International Edition, vol. 59, No. 42, pp. 18532 to 18536, Oct. 2020.

Office Action by the Chinese Patent Office (CNIPA) issued in CN202280074488.5, which is a counterpart hereof, mailed on Aug. 12, 2024, and English translation thereof.

Office Action by the Korean Patent Office issued in KR 10-2024-7018904, which is a counterpart hereof, mailed on Oct. 22, 2024, and English translation thereof.

Office Action by the Korean Patent Office (KIPO) issued in KR 10-2024-7018904, which is a counterpart hereof, mailed on Apr. 22, 2025, and English-language machine translation thereof.

Office Action by the Japanese Patent Office (JPO) issued in JP 2024-526740, which is a counterpart hereof, mailed on Sep. 16, 2025, and English-language translation thereof.

* cited by examiner

SPECTACLE LENS AND METHOD FOR MANUFACTURING A SPECTACLE LENS

CROSS REFERENCE TO RELATED APPLICATIONS

This application is a continuation application of international patent application PCT/EP2022/080477, filed on Nov. 2, 2022 and designating the U.S., which claims priority to European patent application EP 21 206 970.2, filed on Nov. 8, 2021, both of which are hereby incorporated by reference in their entireties.

TECHNICAL FIELD

The present disclosure relates to a spectacle lens and a method for manufacturing a spectacle lens.

BACKGROUND

Several products are offered by spectacle lens manufacturers that contain functionalities to filter out certain wavelength ranges of the incident light and, thus, modify the perceived lightness and color of objects and the lens wearers' surrounding. These functionalities, either conventional dyes, photochromic dyes, antireflective coatings or a combination thereof, are composed in a way to provide a pleasing result, e.g., darkened photochromic lenses upon UV (ultraviolet) exposure, for the wearer. Exemplary products are conventionally tinted lenses, photochromic lenses, and lenses with a front-surface photochromic coating and a backside tint.

The observer's color impression of an object is influenced by three main factors: the illuminant spectrum, the object's absorption, transmission, and/or reflectance spectra, and the sensitivity of the observer's individual photoreceptor cells. The sensitivity of the observer's individual photoreceptor cells shows a wavelength- and angle-dependent trigger probability that provides the biological input for the formation of a color impression.

For wearers of spectacle lenses, the optical properties of the spectacle lens are a further influencing factor, i.e., the object reflectance spectrum observed by the wearer is filtered by the transmission spectrum of the spectacle lens.

The optical filter properties of a spectacle lens can either be permanent, for example in spectacle lenses with conventional dyes, or non-permanent, e.g., in spectacle lenses with photochromic compositions.

In the spectacle lens industry, photochromic compositions are regarded as compositions that darken upon exposure to UV radiation. More specifically, the luminous transmittance of a spectacle lens employing these compounds for the purpose of optical filtering reduces upon exposure to UV radiation.

Apart from photochromic compositions that darken upon exposure to UV radiation, which are referred to as positive photochromic compositions in the following, so-called negative photochromic compositions are known. Whereas optical filter spectra modified by positive photochromic compositions show a reduced luminous transmittance upon UV exposure, those modified by negative photochromic compositions can also show an increased luminous transmittance upon exposure to the UV or VIS (visible) radiation.

The photochromic effect for both of positive and negative photochromic compositions may be based on one of the following mechanisms. Firstly, on the molecular level, UV radiation is of high energy enough to induce the reversible breaking of chemical bonds within the backbone of organic photochromic compositions. Typically, the forward reaction alters the size of existing pi-electron systems and consequently induces the formation or a shift of the absorbance bands of the photochromic molecule within the VIS (visible) region. The backward reaction of the equilibrium process is often thermally induced. Typical examples exhibiting a photochromic effect based on organic backbones are spiropyrans, spirooxazines, diarylethenes, azobenzenes, and quinones.

A second pathway to changes in the optical filter spectra of photochromic compositions is shown by, e.g., E-Z isomerisation of cyanidin dyes for which the required energy for the conformal change is absorbed within the visible region of light (see NEMOTO, K. et. al. "Negative photochromism of a blue cyanine dye," Chem. Commun., 2020, 56, 15205-15207).

Other mechanisms causing a photochromic effect might be possible as well. For example, there are inorganic photochromic compositions and products available, e.g., based on a silver oxide and cerium oxide doped lithium aluminosilicate. An overview concerning photochromic materials naming specific substances and compositions as well as describing relevant mechanism for the photochromic effect is provided by TIAN, H., ZHANG, J. (Ed.), "Photochromic Materials: Preparation, Properties and Applications," 2016, Wiley-VCH Verlag GmbH & Co. KGaA, DOI:10.1002/9783527683734, especially in chapter 1: NAKATANI, K. et al., "Introduction: Organic Photochromic Molecules."

The substances showing a negative photochromic effect include, but are not limited thereto, azobenzene, spiropyran derivatives including spirobenzopyran, dihydropyrenes such as dimethyldihydropyrenes, Stenhouse salts, imidazolyl radical complex such as 1,1'-binaphthyl-bridged imidazole dimers, and cyanine dyes such as blue cyanine dye (BCy).

Chemical groups and distinct examples of negative photochromic compositions are, e.g., dihydropyrenes ("lighten up" effect (i.e., conversion to the colored state) caused by ring opening/closing), 1,1'-binaphthyl-bridged phenoxyl-imidazolyl radical complex ("lighten up" effect caused by forming radical complexes), and blue cyanine dye (BCy; "lighten up" effect caused by E-Z isomerization).

Specific examples for negative photochromic substances and compositions are disclosed, inter alia, in YAMAGUCHI, T. et al. "Fast Negative Photochromism of 1,1'-Binaphthyl-Bridged Phenoxyl-Imidazolyl Radical Complex," J. Am. Chem. Soc. 2016 138 (3), 906-913; NEMOTO, K. et. al. "Negative photochromism of a blue cyanine dye," Chem. Commun., 2020, 56, 15205-15207; FUNASAKO, Y. et al. "Synthesis, Photochromic Properties, and Crystal Structures of Salts Containing a Pyridinium-Fused Spiropyran: Positive and Negative Photochromism in the Solution and Solid State," J. Phys. Chem. B 2020, 124, 33, 7251-7257; SARKAR, R. et al. "Electronic Excited States and UV-Vis Absorption Spectra of the Dihydropyrene/Cyclophanediene Photochromic Couple: a Theoretical Investigation," J. Phys. Chem. A 2020, 124, 8, 1567-1579.

In addition to the negative photochromism of single molecules, for which the containing solvent or embedding matrix does not undergo a concurrent change of properties upon de-/activation, the macroscopic effect can also be achieved by embedding de-/protonable dye substances (indicator dye substances) into a matrix wherein the matrix reacts to UV and/or VIS illumination, respectively, with a response.

For example, a photosensitive matrix releasing protons (pH-change through metastable-state photoacid) may favour the protonation of a colored indicator dye substance, whose protonated form is less or not colored at all. An example of the light-triggered release of protons and their effect on the pH-dependent absorbance spectrum of a dye was shown in ALGHAZWAT, O. et al. "Red-light responsive metastable-state photoacid," Dyes and Pigments 171, 107719.

In general, positive photochromic compositions used in spectacle lenses enable the wearer-perceived darkening of the spectacle lens upon illumination in the UV range (L* value of L*a*b* color space). This darkening may be associated with an undesired change of perceived color (a* and b* values of L*a*b* color space).

Consequently, the wearer's color impression and perceived contrast of the same object may be altered depending on the UV exposure conditions of the spectacle lens.

Moreover, spectacle lenses with positive photochromic compositions do not allow for changing the wearer's color impression under different UV exposure conditions without altering the perceived lightness due to changes of the luminous transmittance. Spectacle lenses comprising conventional dye substances do not allow for any changes of their optical filter spectrum in response to different UV exposure conditions by the environment, e.g., neither a change in perceived lightness nor in color.

Besides, a quantitative description of contrast sensitivity is reported in the related art by BARTEN, P. "Formula for the contrast sensitivity of the human eye," Proc. SPIE 5294 Image Quality and System Performance, 18 Dec. 2003; doi: 10.1117/12.537476 wherein different influencing factors on contrast sensitivity in human eyesight are shown (see FIG. 4 of the mentioned publication). A pair of shades can affect the influence of the noise on the contrast sensitivity of the eye. BARTEN, P. shows, that contrast of an object is a function of the ratio LS/L wherein LS is the surrounding luminance and L is the luminance of the object. Thus, a dark object is difficult to see in an overly bright scene.

In addition, LINGELBACH, B. et al. show that contrast sensitivity (perception) also depends on the varying sensitivity of the eye towards different parts of the spectrum. That is, scattered blue light will create more "noise" in the visual system, making it harder to differentiate an important object from the background (LINGELBACH, B. et al. Journal of ASTM International, January 2005, Vol. 2, No. 1; DOI: 10.1520/JAI11972).

According to LINGELBACH, B. et al., a pair of traditional contrast enhancing spectacle lenses does try to eliminate the "noise part" of the spectrum in the background, leaving the different spectrum of the important object as much as possible untouched, thereby enhancing contrast. It is obvious, that for a traditional spectacle lens this works best under a particular, predefined illumination, e.g., in bright light for skiing glasses. However, these contrast enhancing spectacle lenses according to the related art will not allow for sufficient contrast enhancement under varying conditions such as a change of the ambient spectrum and/or the overall level of lightness.

U.S. 2013/102775 A1 discloses a photochromic material formed of a biimidazole compound that demonstrates negative photochromism. Specific examples of applications include optical switches, printing materials, recording materials and holographic materials.

U.S. 2019/382654 A1 discloses materials exhibiting negative photochromism that can be used for applications such as glasses and color contact lenses.

U.S. 2012/183810 A1 discloses photochromic materials that can more quickly transition from the colored form to the clear form, as compared to conventional photochromic materials. Such materials may be used in an ophthalmic element, such as corrective lenses.

U.S. 2020/201079 A1 discloses an optical lens containing a laminated film which includes a first adhesive layer, a first barrier layer, a photochromic layer exhibiting positive photochromism, a second barrier layer, and a second adhesive layer.

JP 2010 270163 A discloses a photochromic material and a photochromic laminated body.

SUMMARY

With respect to the mentioned related art it is an objective of the present disclosure to provide a spectacle lens whose optical filter spectrum allows for further improvements and modifications of a visual impression of an object observed by a wearer through the spectacle lens. It would be desirable to provide a spectacle lens which allows for achieving a wearer-perceived color of an object observed through the spectacle lens without greatly altering the lightness of his visual impression, which can be described by, for example, L* in L*a*b* color space.

Furthermore, it would be desirable to provide a spectacle lens whose optical filter properties allow for contrast enhancement under varying conditions such as a change of the ambient illuminant spectrum and/or the overall level of lightness.

It is a further objective of the present disclosure to provide a method for manufacturing a spectacle lens which allows for further improvements and modifications of a visual impression of an object observed by a wearer through the spectacle lens.

The first objective is achieved by a spectacle lens containing a composition exhibiting a negative photochromic property and a composition exhibiting a positive photochromic property. The further objective is achieved by a method for manufacturing such a spectacle lens.

Throughout this specification the following definitions apply:

The term "absorption" refers to a process in which a medium extracts energy from electromagnetic radiation, e.g., light and/or UV radiation, passing through it, thereby weakening its intensity. The absorbed energy may lead to a heating of the medium.

The term "contrast sensitivity" describes the ability to perceive differences in luminance in the field of vision. It can be defined as the inverse of the modulation threshold of a sinusoidal luminance pattern with a modulation threshold defined by 50% probability of detection. The contrast sensitivity function relates the contrast sensitivity to the spatial frequency.

The term "D65 light source" refers to a standard illuminant that is a source of visible light with a certain spectral power distribution. It provides a basis for comparing images or colors recorded under different illumination. "D" light sources are light sources that are constructed to represent natural daylight. The color temperature, i.e., the temperature of an ideal black-body radiator that radiates light of a color comparable to that of the light source, of a D65 light source is about 6500 K. The D65 light source is defined by the International Commission on Illumination (CIE) as described in ISO 11664-2:2007, Colorimetry—Part 2: CIE standard illuminants) and DIN 5033-7:2014-10, particularly in Section 5.1.

The term "dye substance" refers to a colored substance that makes the spectacle lens permanently appear in a certain tint or is used to permanently change the tint of the spectacle lens. The term "indicator dye substance" refers to a substance that exhibits at least two states, e.g., protonated and deprotonated states, wherein the at least two states exhibit different absorption spectra in the visible part of the electromagnetic spectrum, i.e., from 380 nm to 780 nm. For example, protonation and deprotonation, respectively, may be induced by a change of the pH value. It is the latter that can permanently tint a spectacle lens, whereas an indicator dye substance exhibits photochromism based on a change in pH.

The term "L*a*b* color space," also referred to as CIELAB color space, indicates a color space which expresses colors as three values: L* for perceptual lightness, and a* and b* for the four unique colors of human vision: red, green, blue, and yellow. The calculation method of the parameters L*, a*, and b* is specified in DIN EN ISO/CIE 11664-4:2019, Colorimetry—Part 4: CIE 1976 L*a*b* Color space.

The term "laterally adjacent to each other" refers to an arrangement wherein two compositions are arranged with or without contact to each other in the same plane, for example within one coating. For example, two compositions can be arranged side by side in the form of pixels, with or without contact of the pixels.

The term "light," if solely used, refers to electromagnetic radiation that is capable of directly evoking a visual sensation in humans (visible light), i.e., electromagnetic radiation with a wavelength between 380 nm and 780 nm.

The term "luminous transmittance" $\tau v$ refers to the ratio of the luminous flux transmitted by the lens to the incident luminous flux as defined in DIN EN ISO 8980-3:2014-03, section 3.4.

$$\tau_V = 100 \times \frac{\int_{380nm}^{780nm} \tau(\lambda) \cdot V(\lambda) \cdot S_{D65}(\lambda) \cdot d\lambda}{\int_{380nm}^{780nm} V(\lambda) \cdot S_{D65}(\lambda) \cdot d\lambda} \%$$

where $\tau(\lambda)$ is the spectral transmittance of the spectacle lens; $V(\lambda)$ is the spectral luminous efficiency function for daylight (see DIN EN ISO/CIE 11664-1:2020-03), and $S_{D65}(\lambda)$ is the spectral distribution of radiation of CIE standard illuminant D65.

In other words, luminous transmittance is a measure of the amount of electromagnetic radiation emitted from a reference illuminant such as a D65 light source that passes through a medium and that can be perceived by the human eye.

The term "composition" refers to a chemical substance or a mixture of different chemical substances.

The term "composition exhibiting a negative photochromic property" refers to a composition which behaves like a negative photochromic substance. A composition exhibiting a negative photochromic property macroscopically changes from a state with lower luminous transmittance to a state with higher luminous transmittance when illuminated in the UV and/or VIS range. This can be resulted because the composition actually comprises or consists of a negative photochromic substance, or because the composition comprises a photosensitive matrix with at least one indicator dye substance which exhibits negative photochromism.

The term "composition exhibiting a positive photochromic property" refers to a composition which behaves like a positive photochromic substance. A composition exhibiting a positive photochromic property macroscopically changes from a state with higher luminous transmittance to a state with lower luminous transmittance when illuminated in the UV and/or VIS range. This can be achieved because the composition actually comprises or consists of a positive photochromic substance, or because the composition comprises a photosensitive matrix with at least one indicator dye substance which macroscopically exhibits positive photochromism.

The term "photosensitive matrix" refers to a chemical composition which is used for incorporating, e.g., embedding, an indicator dye substance and which reacts to illumination with radiation of the UV and/or VIS range with a response. The response can be, for example, the release of protons, e.g., due to a pH-change through a metastable-state photo acid. The response can be employed to influence the equilibria between the protonated form and deprotonated form, respectively, of the indicator dye substance leading to the macroscopical exhibition of positive or negative photochromism or the equilibria between the activated and non-activated states of negative and/or positive photochromic substances.

The term "photochromism" refers to the reversible transformation of a chemical species, e.g., a molecule, between two forms or states, respectively, e.g., isomers, induced by the absorption of UV radiation and/or VIS radiation. The two forms may inherently exhibit different absorption spectra in the visible part of the electromagnetic spectrum, i.e., from 380 nm to 780 nm, or they may cause another chemical species to transform between two forms or states, respectively, wherein these two forms or states exhibit different absorption spectra in the visible part of the electromagnetic spectrum.

The two states or forms, respectively, are referred to as activated state or form (after illumination in the UV and/or VIS range) and non-activated state or form (before illumination in the UV and/or VIS range). The process of transforming the non-activated state or form into the activated state or form is referred to as activation, and the process of transforming the activated state or form into the non-activated state or form is referred to as deactivation.

The required wavelength of UV and/or VIS radiation to induce this transformation depends on the energy required to enable the jump of electrons into an antibonding orbital. Therefore, the wavelength is molecule specific. Together with the absorption spectra, the luminous transmittance is affected accordingly. The luminous transmittance for spectacle lenses with photochromic substances in both states can be determined by standard procedures as described in DIN EN ISO 8980-3:2014-03, Section 7.5. The ratio of the luminous transmittance in its thermodynamically stable state to the luminous transmittance after UV and/or VIS illumination is called photochromic response (see DIN EN ISO 8980-3:2014-03, Section 6.4.1). Thus, a photochromic composition (photochromic material) is a composition that reversibly changes its luminous transmittance depending upon the irradiance and wavelength of the optical radiation falling upon it (see DIN EN ISO 13666:2019-12, Section 3.3.5), and a photochromic spectacle lens is a spectacle lens that reversibly changes its luminous transmittance depending upon the irradiance and wavelength of the optical radiation to which it is exposed (see DIN EN ISO 13666:2019-12, Section 3.5.11).

"Positive photochromism" means that the activated state of a composition exhibits a lower luminous transmittance than the non-activated state, wherein the activation occurs via illumination in the UV and/or VIS range. Thus, the photochromic response is positive. It is to be noted that in this context the terms "higher" and "lower" are a relative concept only used to compare the luminous transmittance of the two states with each other and do not allow absolute statements about the luminous transmittance.

"Negative photochromism" means that the activated state of a composition exhibits a higher luminous transmittance than the non-activated state, wherein the activation occurs via illumination in the UV and/or VIS range; thus, the photochromic response is negative. This is a photochromic reaction in which the thermally stable colored form (non-activated state) isomerizes to the metastable colorless form (activated state) upon illumination of light and the generated colorless form thermally returns to the initial colored form.

The term "negative photochromic substance" refers to a chemical substance which exhibits negative photochromism inherently due to its chemical structure. Its molecular structure changes from a state with lower luminous transmittance to a state with higher luminous transmittance upon activation e.g., by illumination in the UV and/or VIS range. The state with lower luminous transmittance corresponds to the thermodynamically stable form.

The term "positive photochromic substance" refers to a chemical substance which exhibits positive photochromism inherently due to its chemical structure. Its molecular structure changes from a state with higher luminous transmittance to a state with lower luminous transmittance upon activation e.g., by illumination in the UV and/or VIS range. The state with higher luminous transmittance corresponds to the thermodynamically stable form.

The term "printing" or "to print," respectively, refers to a process of applying a material to a surface by using printing technologies such as inkjet printing. The term "inkjet printing" refers to a non-contact method of creating a pattern on a surface by discrete deposition of ink droplets. Common procedures for inkjet printing include the continuous inkjet method and the drop-on-demand method, both well known to the person skilled in the art.

The term "semi-finished lens blank" refers to a piece of optical material with one optically finished surface for the making of a spectacle lens (DIN EN ISO 13666:2019-12, Section 3.8.1). The term "finished lens blank" refers to a piece of optical material with two optically finished surfaces (front surface and back surface) for the making of a spectacle lens, but before coating, polishing, etc. procedures.

The term "spectacle lens" refers to an ophthalmic lens worn in front of, but not in contact with, the eyeball (DIN EN ISO 13666:2019-12, Section 3.5.2), where an ophthalmic lens is a lens intended to be used for purposes of measurement, correction and/or protection of the eye, or for changing its appearance (DIN EN ISO 13666:2019-12, Section 3.5.1). Here, a spectacle lens includes, but not limited thereto, a corrective lens, a protective lens, a polarizing lens, a balancing lens, a matching lens, etc. as defined in Sections 3.5.3 to 3.5.13 of DIN EN ISO 13666:2019-12. Further, according to Section 3.6 of DIN EN ISO 13666:2019-12, a spectacle lens can have various lens shapes including, but not limited thereto, curved-form lens, plano lens, spherical lens, cylindrical lens, spherocylindrical lens, toric lens, aspheric lens, atoric lens, etc. The term "spectacle lens" includes the uncut finished lens according to Section 3.8.8 of DIN EN ISO 13666:2019-12, i.e., the finished lens prior to edging, and the edged lens according to Section 3.8.9 of DIN EN ISO 13666:2019-12, i.e., the finished lens edged to the final size and shape, wherein the term finished lens refers to a lens of which both sides have their final optical structure according to Section 3.8.7 of DIN EN ISO 13666:2019-12.

The term "spectacle lens substrate" refers to a piece of optical material that is used during the manufacturing process of a spectacle lens and forms part of the finished spectacle lens. The spectacle lens substrate may undergo several procedures such as coating, cleaning, polishing, etc., before becoming part of the finished spectacle lens. In other words, the spectacle lens comprises the spectacle lens substrate and at least a material exhibiting a negative photochromic property or consists of the spectacle lens substrate and at least a material exhibiting a negative photochromic property. Apart from the spectacle lens substrate and the material exhibiting a negative photochromic property, the spectacle lens may comprise coatings, such as antireflective coatings.

The term "spectrum" refers to an optical spectrum, e.g., an absorption spectrum, a transmission spectrum, etc., showing the amount, usually as percentage, of absorbed, transmitted, etc. electromagnetic radiation depending on the wavelength of the electromagnetic radiation.

The term "substance" refers to a single chemical substance, i.e., a form of matter having constant chemical composition and characteristic properties.

The term "surface" refers to any layer of the three-dimensional spectacle lens substrate that is in direct contact with the environment. The surface can be regarded as its boundary. The surfaces of a spectacle lens substrate include its front surface, i.e., front side, side surface, i.e., edge, and back surface, i.e., back side. In the context of a spectacle lens, the expression "back surface" is used for a surface of a spectacle lens which when mounted and worn in the spectacle frame faces towards the wearer's eye (DIN EN ISO 13666:2019-12, Section 3.8.14). In the context of a spectacle lens substrate, the expression "back surface" is used for a surface which will eventually become the back surface of a spectacle lens that comprises the spectacle lens substrate. In the context of a spectacle lens, the term "front surface" is used for a surface of a spectacle lens which when mounted and worn in the spectacle frame faces away from the wearer's eye. In the context of a spectacle lens substrate, the term "front surface" is used for a surface which will eventually become the front surface of a spectacle lens that comprises the spectacle lens substrate.

The term "transmission" refers to a process in which electromagnetic radiation, e.g., light and/or UV radiation, passes through a medium. The extent of transmission can be described by the luminous transmittance as defined in DIN EN ISO 8980-3:2014-03, Section 3.4, i.e., the ratio of the luminous flux transmitted by the lens to the incident luminous flux. In other words, luminous transmittance is a measure of the amount of electromagnetic radiation that passes through a medium.

The term "ultraviolet radiation" or, in short, "UV radiation" includes UV-A, UV-B, and UV-C radiation and refers to electromagnetic radiation with a wavelength between 100 nm and 380 nm (Section 3.1.3 of DIN EN ISO 13666:2019-12).

The term "VIS" refers to visible electromagnetic radiation, i.e., electromagnetic radiation with a wavelength of 380 nm to 780 nm (Section 2 of ISO 20473:2007-04).

The term "wearer" refers to an individual wearing spectacle lenses, i.e., observing an object through a spectacle lens while the spectacle lenses are worn in an as-worn position.

The "as-worn position" is the position, including orientation, of the spectacle lenses relative to the eyes and face during wear (DIN EN ISO 13666:2019-12, Section 3.2.36). The as-worn position is determined by the as-worn pantoscopic angle, the as-worn face form angle and the vertex distance. The as-worn pantoscopic angle is the vertical angle between the horizontal and the perpendicular to a reference line passing through the apex of the grooves of the upper and lower rims of the frame in the vertical plane containing the primary direction (DIN EN ISO 13666:2019-12, Section 3.2.37), where the primary direction is the direction of the line of sight, usually taken to be the horizontal, to an object at an infinite distance measured with habitual head and body posture when looking straight ahead in unaided vision (DIN EN ISO 13666:2019-12, Section 3.2.25) and the line of sight is the ray path from the point of interest (i.e., point of fixation) in object space to the centre of the entrance pupil of the eye and its continuation in image space from the centre of the exit pupil to the retinal point of fixation (generally the foveola) (DIN EN ISO 13666:2019-12, Section 3.2.24). Typical values of the as-worn pantoscopic angle lie in the range between −20 and +30 degree. The as-worn face form angle is the horizontal angle between the primary direction and the perpendicular to a reference line passing through the apex of the grooves of the nasal and temporal rims of the frame in the horizontal plane containing the primary direction (DIN EN ISO 13666:2019-12, Section 3.2.38). Typical values of the as-worn face form angle lie in the range between −5 and +30 degree. The vertex distance is the horizontal distance between the back surface of the spectacle lens and the apex of the cornea, measured with the eyes in the primary position (DIN EN ISO 13666:2019-12, Section 3.2.40), where the primary position is the position of the eye when looking in the primary direction (DIN EN ISO 13666:2019-12, Section 3.2.26). Typical values of the vertex distance lie in the range between 5 mm and 30 mm. The as-worn position may be an individual as-worn position determined for a specific individual or a generic as-worn position determined for a defined group of wearers.

The articles “a,” “an,” and “the” as used in this specification and the appended claims include plural referents unless expressly and unequivocally limited to one referent.

The term “and/or” as used herein, when used in a series of two or more elements, means that any of the listed elements may be used alone, or any combination of two or more of the listed elements may be used. For example, when describing an illumination in the UV and/or VIS range, the illumination may be done with visible light alone, UV radiation alone, or visible light and UV radiation in combination.

In a first aspect, the disclosure provides a spectacle lens. The spectacle lens comprises a composition exhibiting a negative photochromic property and a composition exhibiting a positive photochromic property.

The composition exhibiting a negative photochromic property may, for example, be present on one or more surfaces of a spectacle lens substrate of the spectacle lens and/or it may be incorporated into the spectacle lens substrate.

The composition exhibiting a negative photochromic property enables the broadening of obtainable visual effects, such as color shifts, color stabilization, contrast adaption, etc. under different illumination in the UV and/or VIS range radiation conditions when compared to conventional spectacle lenses comprising a dye substance and/or a positive photochromic composition only. Hence, the present spectacle lens allows for better customisation of its absorption spectra to a wearer’s individual needs.

Specifically, the composition exhibiting a negative photochromic property may enable a color shift without or almost without changes in lightness upon illumination in the UV and/or VIS range. The lightness can be detected, for example, by observing the L* parameter of the L*a*b* color space. In other words, the a* and b* parameters of the L*a*b* color space can be changed under different UV radiation conditions without or almost without altering the L* parameter.

For example, in interior spaces like offices etc. it may be desired to have the spectacle lens absorb blue light using a composition exhibiting a negative photochromic property, i.e., the spectacle lens may appear yellowish. If however, the light conditions change due to outside daylight conditions comprising UV radiation, e.g., the wearer wearing the spectacle lens leaves the office and goes outside the office building, there will be a change in the absorption spectrum of the spectacle lens due to the exposure to UV radiation leading to lower absorption of blue light, i.e., the spectacle lens appears colorless instead of yellowish.

The composition exhibiting the negative photochromic property and the composition exhibiting the positive photochromic property may be, for example, arranged side-by-side, e.g., as droplets, or stacked, e.g., as a stacked layer-by-layer or pixel-by-pixel structure.

By combining the composition exhibiting the negative photochromic property and the composition exhibiting the positive photochromic property even more different visual effects can be obtained when compared to conventional spectacle lenses comprising a dye substance and/or a positive photochromic composition only.

Moreover, a spectacle lens comprising a composition exhibiting a negative photochromic property and a composition exhibiting a positive photochromic property may allow for dynamic contrast adaption under varying conditions such as a change of the ambient illuminant spectrum and/or the overall level of lightness by tuning the optical filter properties accordingly. In other words, a composition exhibiting a negative photochromic property and a composition exhibiting a positive photochromic comprised in a spectacle lens can be used for contrast enhancement.

For example, the color of the spectacle lens can change with the illumination’s spectrum which is, for example, more reddish with low sun and whitish/blueish with high sun, while maintaining a near constant luminous transmittance. This means, the spectacle lens can maintain its contrast enhancing property under a larger variety of ambient lighting conditions.

At the same time, it is equally possible to improve contrast if the illumination intensity varies while maintaining its spectrum, for example, for an observer moving out of the sun and into the shade, e.g., while driving. In such a situation, the spectacle lens comprising a composition exhibiting a negative photochromic property and a composition exhibiting a positive photochromic property can adjust its transmission while maintaining its color hue. The spectacle lens does therefore have the advantage that it works under a much wider set of lighting conditions compared to conventional contrast enhancing spectacle lenses.

For example, the composition exhibiting the positive photochromic property may comprise at least one positive photochromic substance. In other words, the composition exhibiting the positive photochromic property may comprise or consist of one or more positive photochromic substances. The realisation of the positive photochromic property by a positive photochromic substance has the advantage of simple practical implementation, since in the simplest case only one substance, i.e., one positive photochromic substance, is needed.

For example, the at least one positive photochromic substance may be a substance as disclosed in TIAN, H., ZHANG, J. (Ed.), "Photochromic Materials: Preparation, Properties and Applications," 2016, Wiley-VCH Verlag GmbH & Co. KGaA, DOI: 10.1002/9783527683734. In other words, one or more of the mentioned substances can be used as the composition exhibiting a positive photochromic property.

In a specific development of the present spectacle lens, the composition exhibiting the negative photochromic property and the composition exhibiting the positive photochromic property may be arranged on the surface of the spectacle lens substrate laterally adjacent to each other, e.g., side-by-side, for example on the front surface and/or back surface, in particular at least on the front surface for the reasons mentioned above.

To obtain a laterally adjacent arrangement, the composition exhibiting the negative photochromic property and the composition exhibiting the positive photochromic property may be coated pixel-wise on the surface, e.g., by using an inkjet printing method. For example, the coating may comprise alternating pixels of the composition exhibiting the negative photochromic property and the composition exhibiting the positive photochromic property. The pixels may be arranged in contact with one another or separated.

For example, a negative photochromic substance and a positive photochromic substance may be arranged on the surface of the spectacle lens substrate laterally adjacent to each other.

The described laterally adjacent arrangement has the advantage that interactions of the composition exhibiting the negative photochromic property and the composition exhibiting the positive photochromic property which may influence the color and/or lightness properties can be diminished or even avoided. This may allow for a higher degree of freedom regarding the possible filter spectra modification. Besides, an arrangement side-by-side has the advantage of easier calculation and simulation of the resulting overall spectrum as the overall spectrum is solely additive. In a further specific development of the inventive spectacle lens, the composition exhibiting the negative photochromic property may comprise or consist of a photosensitive matrix with at least one indicator dye substance, i.e., a substance whose filter spectrum is sensitive towards the matrix change induced by illumination in the UV and/or VIS range such that macroscopically negative photochromism can be observed. The indicator dye substance may be incorporated into the photosensitive matrix.

A main advantage of using a photosensitive matrix with at least one indicator dye substance for obtaining a negative photochromic effect is that the matrix properties can be adjusted in view of the specific needs of the spectacle lens and its manufacturing. That is, the matrix properties may be adjusted, for example, to allow for good adhesion on the surface of the spectacle lens substrate. Moreover, the matrix may be modified to better resist to demands associated with the manufacturing process such as washing, polishing, spinning, further coating etc.

In a second aspect, the disclosure provides a further spectacle lens. The spectacle lens comprises a composition exhibiting a negative photochromic property. The composition exhibiting the negative photochromic property comprises a photosensitive matrix with at least one indicator dye substance. i.e., a substance whose filter spectrum is sensitive towards the matrix change induced by illumination in the UV and/or VIS range such that macroscopically negative photochromism can be observed. The indicator dye substance may be incorporated into the photosensitive matrix.

A main advantage of using a photosensitive matrix with at least one indicator dye substance for obtaining a negative photochromic effect is that the matrix properties can be adjusted in view of the specific needs of the spectacle lens and its manufacturing. That is, the matrix properties may be adjusted, for example, to allow for good adhesion on the surface of the spectacle lens substrate. Moreover, the matrix may be modified to better resist to demands associated with the manufacturing process such as washing, polishing, spinning, further coating etc.

The composition exhibiting a negative photochromic property enables the broadening of obtainable visual effects, such as color shifts, color stabilization, contrast adaption, etc. under different illumination in the UV and/or VIS range radiation conditions when compared to conventional spectacle lenses comprising a dye substance and/or a positive photochromic composition only. Hence, the present spectacle lens allows for better customisation of its absorption spectra to a wearer's individual needs.

Specifically, the composition exhibiting a negative photochromic property may enable a color shift without or almost without changes in lightness upon illumination in the UV and/or VIS range. The lightness can be detected, for example, by observing the L* parameter of the L*a*b* color space. In other words, the a* and b* parameters of the L*a*b* color space can be changed under different UV radiation conditions without or almost without altering the L* parameter.

For example, in interior spaces like offices etc. it may be desired to have the spectacle lens absorb blue light using a composition exhibiting a negative photochromic property, i.e., the spectacle lens may appear yellowish. If however, the light conditions change due to outside daylight conditions comprising UV radiation, e.g., the wearer wearing the spectacle lens leaves the office and goes outside the office building, there will be a change in the absorption spectrum of the spectacle lens due to the exposure to UV radiation leading to lower absorption of blue light, i.e., the spectacle lens appears colorless instead of yellowish.

In a specific development of the spectacle lens according to the first or second aspect of the disclosure, the composition exhibiting the negative photochromic property may comprise at least one negative photochromic substance.

In other words, the composition exhibiting the negative photochromic property may comprise or consist of one or more negative photochromic substances. The realisation of the negative photochromic property by a negative photochromic substance has the advantage of simple practical implementation, since in the simplest case only one substance, i.e., one negative photochromic substance, is needed.

For example, the at least one negative photochromic substance may be a substance as disclosed in the references named in the background section concerning specific examples for negative photochromic substances and compositions.

In other words, one or more of the mentioned substances can be used as the composition exhibiting a negative photochromic property.

In a further specific development of the spectacle lens according to the first or second aspect of the disclosure, the spectacle lens may comprise a spectacle lens substrate and the composition exhibiting the negative photochromic property may be arranged on a surface of the spectacle lens substrate.

For example, the composition exhibiting the negative photochromic property may be present as a coating on one or more surfaces of the spectacle lens substrate, e.g., its front and/or back surface. In particular, the composition exhibiting the negative photochromic property may be arranged at least on the front surface of the spectacle lens substrate. This enables the effects induced by illumination in the UV and/or VIS range to take place even if the spectacle lens substrate comprises an UV absorber preventing UV radiation to be transmitted through the spectacle lens substrate.

The composition exhibiting the negative photochromic property may be directly coated on the surface of the spectacle lens substrate, i.e., arranged in direct contact with the material of the spectacle lens substrate, or there may be one or more other coatings in between the material of the spectacle lens substrate and the coating comprising or consisting of the composition exhibiting the negative photochromic property. In any case, one or more additional coatings may be arranged above, if regarded from the spectacle lens substrate, the coating comprising or consisting of the composition exhibiting the negative photochromic property, such as antireflective coatings, hard coatings, etc.

Arranging the composition exhibiting the negative photochromic property in direct contact to the surface of the spectacle lens substrate may enhance adhesion and durability of the coating.

The arrangement of the composition exhibiting the negative photochromic property on the surface of a spectacle lens substrate has the advantage of simple practical implementation, as, for example, known coating procedures can be used. Moreover, this allows for realising the optical structure of the spectacle lens substrate beforehand, i.e., a semi-finished lens blank or a finished lens blank may be used to be coated with the composition exhibiting the negative photochromic property. Thus, several identical semi-finished lens blanks or finished lens blanks can be produced at the same time and coated differently at the later stage, for example, with different compositions exhibiting a negative photochromic property.

Alternatively or additionally to an arrangement of the composition exhibiting the negative photochromic property on the surface of the spectacle lens substrate, the composition exhibiting the negative photochromic property may be incorporated into the spectacle lens substrate.

Such an incorporation may be obtained, e.g., by diffusion processes. For instance, the spectacle lens substrate may be immersed into a bath comprising the composition exhibiting the negative photochromic substance allowing for diffusion of the composition exhibiting the negative photochromic substance into the substrate material.

In comparison to a coating, an incorporation into the substrate may be advantageous with respect to mechanical stability.

In a further specific development of the spectacle lens according to the first or second aspect of the disclosure, the spectacle lens may comprise a dye substance. For example, the dye substance may be a non-protonable dye substance exhibiting one state only and is not capable of changing its absorption spectrum upon illumination in the UV and/or VIS range.

For example, the spectacle lens may comprise the composition exhibiting the negative photochromic property and a dye substance, but no composition exhibiting a positive photochromic property, or the spectacle lens may comprise the composition exhibiting the negative photochromic property, a dye substance, and a composition exhibiting a positive photochromic property.

Suitable dye substances are for example Dianix Yellow AM-42, Serilene Scarlet G-LS, Dianix Turquoise S-BG, Terasil Blue 3 RL-01, Teratop Blue GLF, Dorospers Red KKR, Teratop Pink 3G, Dianix Orange S-G and CRX powder dyes such as fluo yellow 5944, lemon yellow 8043, gold yellow 3441, orange 5945, orange 3439, scarlet 3443, red 8153, pink 3442, fuchsia 8168, purple 3735, mauve 3449, aubergine 8169, blue 3437, night 3438, blue 5770, sky 8170, anise green 6755, green 3450, green 3467, dark green 8171, ochre 8172, brown pink 3466, olive brown 3446, smoke 3447, brown 6785, neutral grey 3444, iron grey 8173, grey blue 3445, grey green 5661, black 5894.

If the spectacle lens additionally comprises a dye substance even more different visual effects can be obtained compared to conventional spectacle lenses comprising a dye substance and/or a positive photochromic composition only.

In a third aspect, the disclosure provides a method for manufacturing a spectacle lens. The method comprises the following method steps: providing a spectacle lens substrate; arranging a composition exhibiting a negative photochromic property on a surface of the spectacle lens substrate and/or incorporating a composition exhibiting a negative photochromic property into the spectacle lens substrate; and arranging a composition exhibiting a positive photochromic property on a surface of the spectacle lens substrate and/or incorporating a composition exhibiting a positive photochromic property into the spectacle lens substrate.

Arranging the composition exhibiting a negative photochromic property and/or the composition exhibiting a positive photochromic property on a surface of the spectacle lens substrate may be achieved by coating procedures such as spin coating, dip coating, spray coating, inkjet printing, etc. An incorporation into the spectacle lens substrate may, for example, be achieved by diffusion processes, e.g., imbibing, that may lead to physical entrapment of the composition exhibiting a negative photochromic property and/or the composition exhibiting a positive photochromic property, or chemical binding to the material of the spectacle lens substrate, as appropriate.

Exemplarily, the manufacturing method can be used for manufacturing a spectacle lens according to the first aspect of the disclosure as described above, i.e., a spectacle lens comprising a composition exhibiting a negative photochromic property and a composition exhibiting a positive photochromic property. Hence, the description of the composition exhibiting a negative photochromic property including specific examples and combinations with a composition exhibiting a positive photochromic property and/or a dye substance equally applies to the manufacturing method. The advantages mentioned above with reference to the spectacle lens are associated with the manufacturing method accordingly.

For example, the composition exhibiting the negative photochromic property and the composition exhibiting the positive photochromic property may be arranged on the surface of the spectacle lens substrate laterally adjacent to each other. The composition exhibiting the negative photochromic property and the composition exhibiting the positive photochromic property may be arranged side-by-side, e.g., as droplets, or stacked, e.g., as a stacked layer-by-layer structure.

In a specific development of the method according to the third aspect of the disclosure, the composition exhibiting the negative photochromic property may comprise a photosensitive matrix with at least one indicator dye substance.

In a fourth aspect, the disclosure provides a further method for manufacturing a spectacle lens. The method comprises the following method steps: providing a spectacle lens substrate; and arranging a composition exhibiting a negative photochromic property on a surface of the spectacle lens substrate and/or incorporating a composition exhibiting a negative photochromic property into the spectacle lens substrate. The composition exhibiting the negative photochromic property comprises a photosensitive matrix with at least one indicator dye substance.

Arranging the composition exhibiting a negative photochromic property on a surface of the spectacle lens substrate may be achieved by coating procedures such as spin coating, dip coating, spray coating, inkjet printing, etc. An incorporation into the spectacle lens substrate may, for example, be achieved by diffusion processes, e.g., imbibing, that may lead to physical entrapment of the composition exhibiting a negative photochromic property or chemical binding to the material of the spectacle lens substrate, as appropriate.

Exemplarily, the manufacturing method can be used for manufacturing a spectacle lens according to the second aspect of the disclosure as described above, i.e., a spectacle lens comprising a composition exhibiting a negative photochromic property, wherein the composition exhibiting the negative photochromic property comprises a photosensitive matrix with at least one indicator dye substance. Hence, the description of the composition exhibiting a negative photochromic property including specific examples and combinations with a composition exhibiting a positive photochromic property and/or a dye substance equally applies to the manufacturing method. The advantages mentioned above with reference to the spectacle lens are associated with the manufacturing method accordingly.

In a specific development of the method according to the third or fourth aspect of the disclosure, the composition exhibiting the negative photochromic property and/or the composition exhibiting the positive photochromic property may be printed on the surface of the spectacle lens substrate, for example, using an inkjet printing process. Typical volumes of ink droplets comprising the composition exhibiting the negative photochromic property or the composition exhibiting the positive photochromic property, respectively, may be several picolitres such as 3 to 50 picolitres.

One or both of the composition exhibiting a negative photochromic property and the composition exhibiting a positive photochromic property may be used in pure form, as a solution, dispersion, etc.

BRIEF DESCRIPTION OF THE DRAWINGS

Further features, properties, and advantages of the present disclosure will become clear from the following description of exemplary embodiments in conjunction with the accompanying drawings, wherein.

DESCRIPTION OF EXEMPLARY EMBODIMENTS

Exemplary embodiments of the present spectacle lens will be described with respect to the drawings. The spectacle lenses 1 of the exemplary embodiments each comprises a composition exhibiting a negative photochromic property 2.

Figure 1:
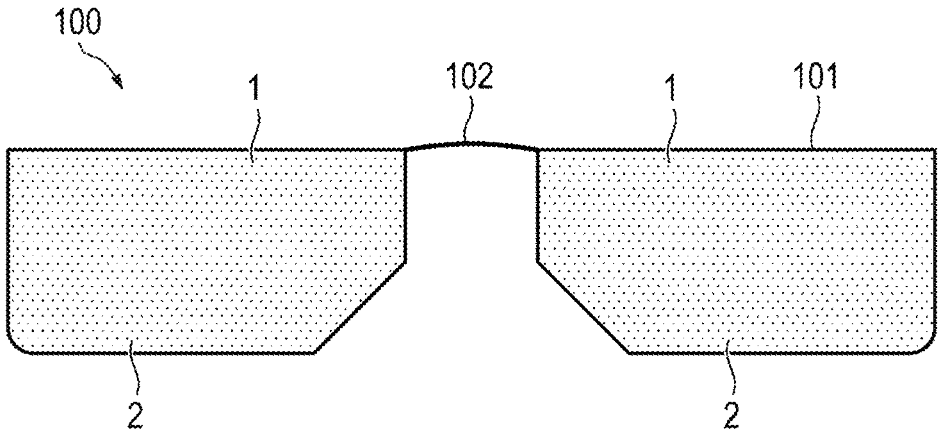
FIG. 1 illustrates an exemplary embodiment of spectacles with spectacle lenses in front view.

FIG. 1 shows spectacles 100 with two single vision spectacle lenses 1, one for the right eye and one for left eye of the wearer. The two spectacle lenses 1 are mounted in a spectacle frame 101 and are separated by the bridge 102 of the spectacle frame 101. The spectacle lenses 1 may be zero, plus, or minus lenses according to the wearer's needs.

FIGS. 2A to 2E show different exemplary embodiments of a spectacle lens 1 which may be incorporated in spectacles 100 as shown in FIG. 1.

Figure 2A:
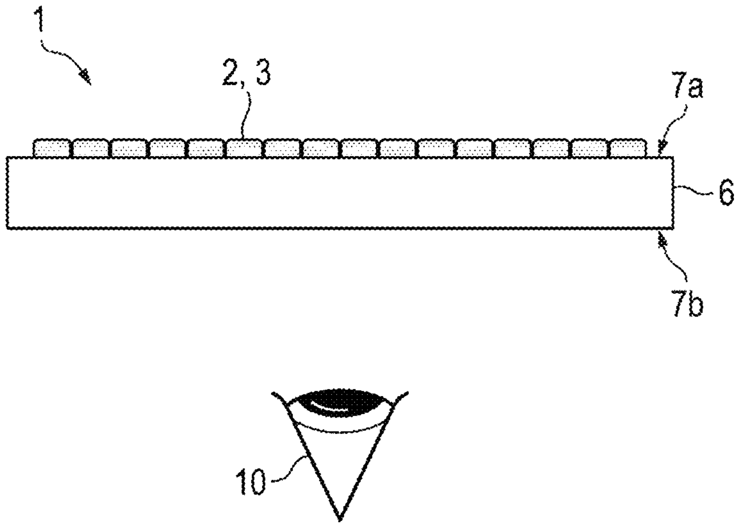
FIG. 2A shows an exemplary spectacle lens in side view not encompassed by the wording of the claims but considered as useful for understanding the disclosure.

In the first exemplary embodiment according to FIG. 2A (not covered by the subject-matter of the claims), the spectacle lens 1 comprises a spectacle lens substrate 6, for example, made for example of a polymeric material. The spectacle lens substrate 6 comprises a front surface 7*a* and a back surface 7*b* which are defined depending on the position of the wearer's eye 10 when the spectacle lens 1 is worn in front of the wearer's eye. However, unless otherwise state, surface modification of the front surface 7*a* can be applied to the back surface 7*b* and vice versa.

On the front surface 7*a* of the spectacle lens substrate 6, a composition exhibiting a negative photochromic property 2 is arranged, for example, in the form of distinct droplets or in the form of a continuous layer. The negative photochromic property is obtained by a negative photochromic substance 3, i.e., the composition exhibiting the negative photochromic property 2 and the negative photochromic substance 3 are identical. The composition exhibiting the negative photochromic property 2 may cover the complete front surface 7*a* or only a part of it.

Moreover, one or more additional coatings (not shown) can be applied, for example, antireflective coatings and/or hard coatings. Such additional coatings can be arranged between the surface 7*a*, 7*b* and the composition exhibiting the negative photochromic property 2 or above the composition exhibiting the negative photochromic property 2.

Figure 2B:
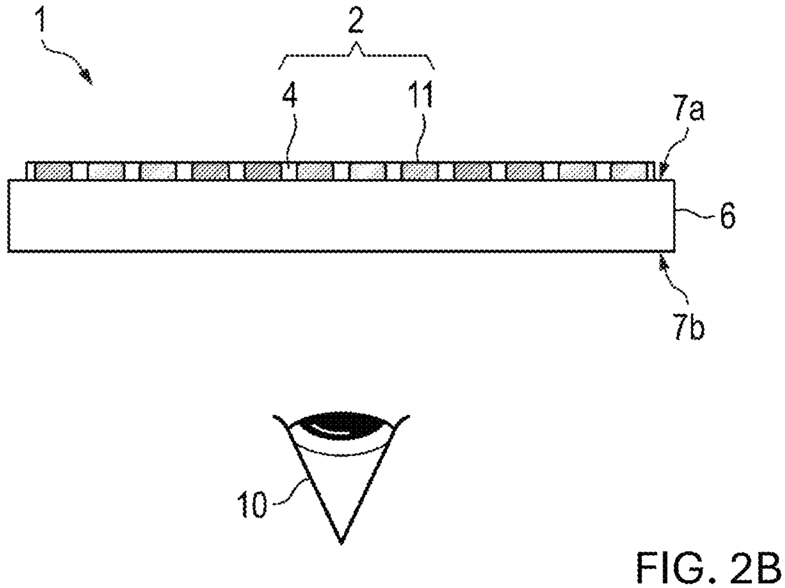
FIGS. 2B to 2E show exemplary embodiments of a spectacle lens in side view.

FIG. 2B shows another exemplary embodiment of a spectacle lens 1. In contrast to the exemplary embodiment described with respect to FIG. 2A, the composition exhibiting the negative photochromic property 2 does not comprise a negative photochromic substance 3, but a photosensitive matrix 4 with an indicator dye substance 11 instead.

Figure 2C:
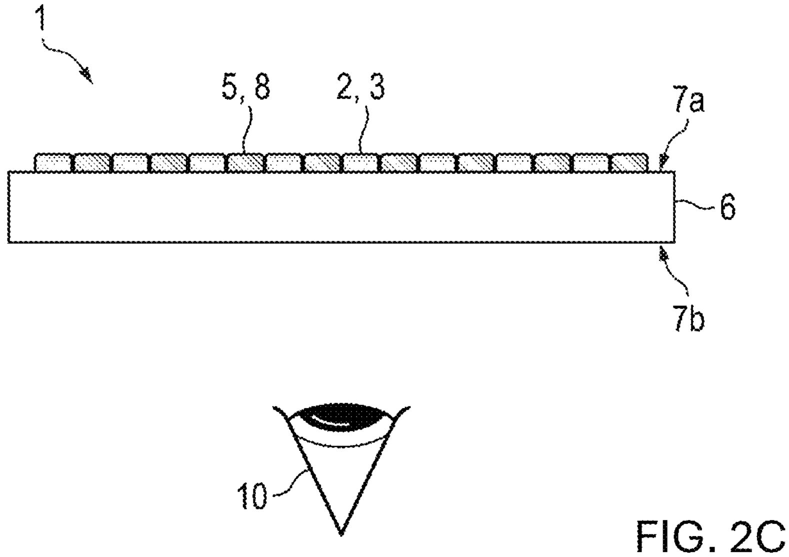

FIG. 2C shows another exemplary embodiment of a spectacle lens 1. In contrast to the exemplary embodiment described with respect to FIG. 2A, a composition exhibiting a positive photochromic property 8 is additionally arranged on the front surface 7*a*. The composition exhibiting the positive photochromic property 8 consists of a positive photochromic substance 5.

The composition exhibiting the negative photochromic property 2 and the composition exhibiting the positive photochromic property 8 are arranged on the surface 7 of the spectacle lens substrate 6 laterally adjacent to each other by alternately depositing droplets, e.g., by inkjet printing, of the composition exhibiting the negative photochromic property 2 and the composition exhibiting the positive photochromic property 8 in the same plane. Thus, properties of the composition exhibiting the negative photochromic property 2 and the composition exhibiting the positive photochromic property 8 can both be used for modifying the optical properties of the spectacle lens 1 without influencing each other.

Figure 2D:
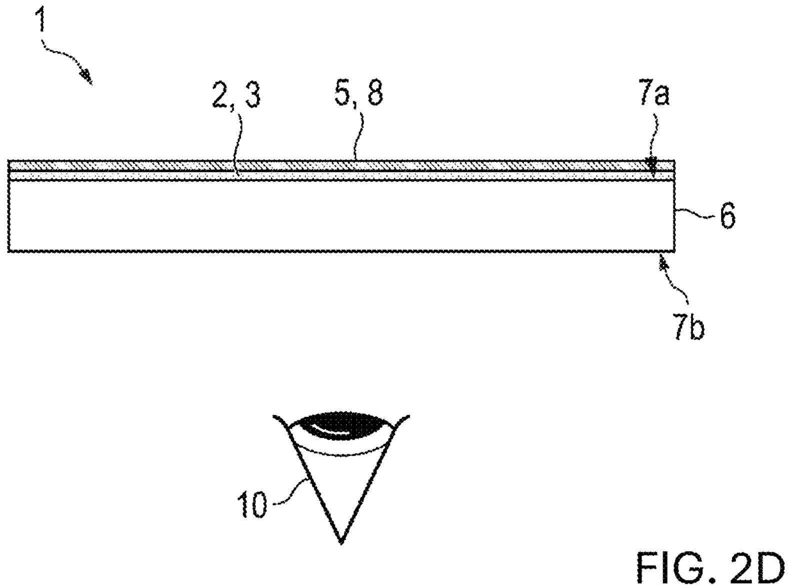

FIG. 2D shows another exemplary embodiment of a spectacle lens 1. Here, as compared to the exemplary embodiment described with respect to FIG. 2A, a composition exhibiting a positive photochromic property 8 is additionally arranged on the front surface 7*a*. The composition exhibiting the positive photochromic property 8 consists of a positive photochromic substance 5.

The composition exhibiting the negative photochromic property 2 and the composition exhibiting the positive photochromic property 8 are arranged as stacked layers on the surface 7 of the spectacle lens substrate 6. In FIG. 2D the layer comprising the composition exhibiting the negative photochromic property 2 is directly located on the front surface 7*a*, whereas the composition exhibiting the positive photochromic property 8 is arranged as a layer above the layer comprising the composition exhibiting the negative photochromic property 2. However, the order may be changed, i.e., a layer comprising the composition exhibiting the positive photochromic property 8 may be directly located on the front surface 7*a*, whereas the composition exhibiting the negative photochromic property 2 may be arranged as a layer above the layer comprising the composition exhibiting the positive photochromic property 8. The deposition as layers allows for employing conventional coating procedures and is thus easy to implement.

Figure 2E:
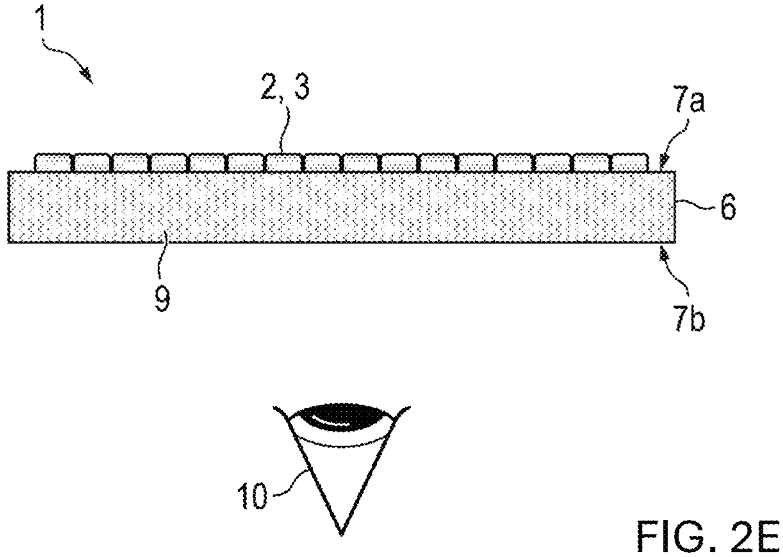

FIG. 2E shows another exemplary embodiment of a spectacle lens 1. In contrast to the exemplary embodiment described with respect to FIG. 2A, the spectacle lens substrate 6 comprises a dye substance 9 leading to a permanent hue of the spectacle lens 1. It is to be noted that the spectacle lens substrate 6 comprising a dye substance 9 as shown in FIG. 2E may be combined with the exemplary embodiments described with respect to FIGS. 2B to 2C in the same way.

Figure 3:
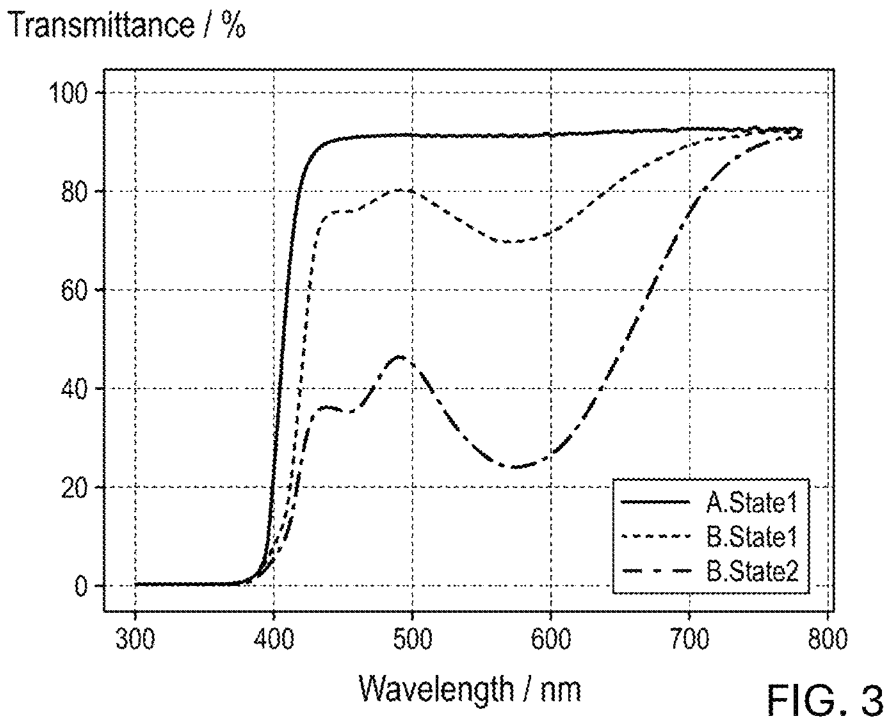
FIG. 3 shows UV-VIS absorption spectra of a clear spectacle lens (Sample A) and a photochromic spectacle lens (Sample B) according to the related art in activated and deactivated state.

The optical effects that are obtainable by the present spectacle lens 1 are described below with reference to FIGS. 3 to 8 where FIG. 3 illustrates optical properties of a conventional spectacle lens 1 according to the related art, and FIGS. 4 to 8 illustrate optical properties of present spectacle lenses 1, for example as shown in FIGS. 2A to 2E. The UV-VIS spectra in FIGS. 4 to 8 show the dependence of the transmittance in percent on the wavelength in nm, i.e., the transmittance in the visible range that influences the perceived lightness and color of an object observed by a wearer through the spectacle lens, upon illumination with a D65 light source.

FIG. 3 shows an UV-VIS absorption spectrum of a clear spectacle lens without any coatings (sample A) for comparison (spectrum labelled "A.State1"). The "UV edge," i.e., the sharp decrease in transmittance, at approximately 400 nm is caused by the UV absorber contained in the spectacle lens substrate. Upon illumination in the UV-VIS range, no changes occur in the spectrum.

Furthermore, FIG. 3 shows UV-VIS absorption spectra of a spectacle lens according to the related art, namely a grey Zeiss PhotoFusion spectacle lens (sample B), i.e., a spectacle lens with a coating exhibiting a positive photochromic effect, at two different states of activation (State 1 and State 2), i.e., increasing time of illumination in the UV-VIS range. The spectrum labelled "B.State1" corresponds to the UV-VIS absorption spectrum in a slightly darkened state, i.e., after a short period of illumination in the UV-VIS range. The spectrum labelled "B.State2" corresponds to the UV-VIS absorption spectrum in a more darkened state, i.e., after a longer period of illumination in the UV-VIS range. The "UV edge" at approximately 400 nm is caused by the UV absorption of the photochromic composition of the coating and the UV absorber contained in the spectacle lens substrate. As can be concluded from FIG. 3, UV exposure leads to concurrent growth of absorption peaks, i.e., absorption is enhanced almost throughout the whole visible spectral range leading to correspondingly lower luminous transmittance.

Table 1 gives an overview of the corresponding L*a*b* values of the L*a*b* color space as well as the parameters "x," "y," and the luminous transmittance abbreviated to "LTM" of sample B. The parameter "L*" corresponds to the perceived lightness, the parameter "a*" corresponds to the blue-yellow axis and the parameter "b*" corresponds to the red-green axis. The parameters "x" and "y" are the chromaticity coordinates of the CIE 1931 color space.

TABLE 1

Parameters corresponding to the spectra shown in FIG. 3.

| | x | y | L* | a* | b* | LTM |
|---|---|---|---|---|---|---|
| B. State1 | 0.312 | 0.332 | 88.73 | −1.11 | −0.11 | 73.59 |
| B. State2 | 0.294 | 0.310 | 62.53 | −0.06 | −7.96 | 31.03 |

When activating the Zeiss PhotoFusion spectacle lens (already partially activated), the luminous transmittance is reduced from 73.59% to 31.03%. The maxima of the absorption bands in the VIS range (the coating comprises a mixture of different photochromic substances) are at approximately 580 nm and 465 nm. When the photochromic substances are activated, the transmission decreases in the entire VIS range. The L* parameter value decreases from 88.73 to 62.53 (perceived brightness). The a* parameter value changes from −1.11 to −0.06, which corresponds to a very slight shift of the color towards red. The b* parameter value changes from −0.11 to −7.96, which corresponds to a clearly perceptible shift of the color from yellow towards blue.

Figure 4:
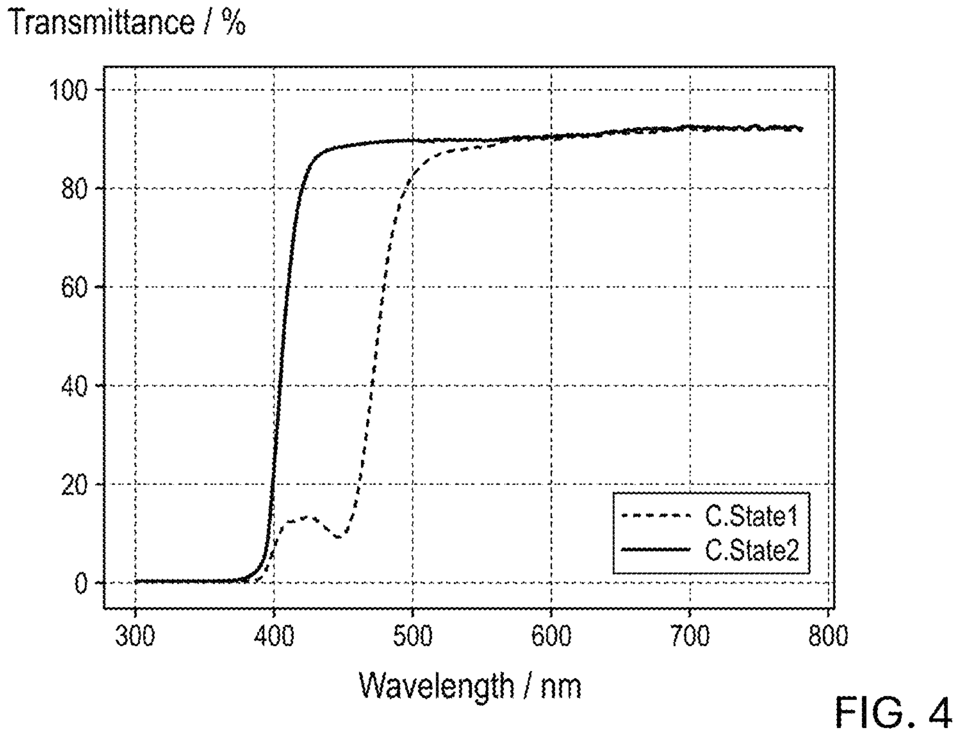
FIG. 4 shows UV-VIS absorption spectra of a photochromic spectacle lens (Sample C) according to an exemplary embodiment of the disclosure in activated and deactivated state.

FIG. 4 shows simulated UV-VIS absorption spectra of a spectacle lens 1 according to a first exemplary embodiment of the present disclosure, i.e., of a spectacle lens 1 with a coating comprising a composition exhibiting a negative photochromic property 2 (sample C). Here, the composition exhibiting negative photochromic property 2 is a 1,1'-binaphthyl-bridged phenoxyl-imidazolyl radical complex with the following chemical formula (1):

(1)

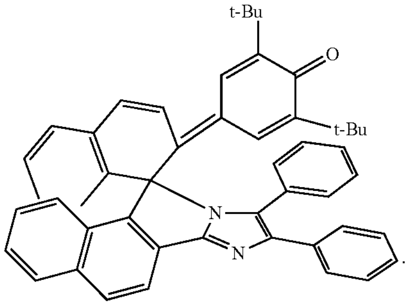

The transmittance spectra of sample C were derived by using FIG. 2A left and center in YAMAGUCHI, T. et al. "Fast Negative Photochromism of 1,1'-Binaphthyl-Bridged Phenoxyl-Imidazolyl Radical Complex," J. Am. Chem. Soc. 2016 138 (3), 906-913. The disclosed spectra were multiplied by the UV-VIS filter spectra of a 2 mm uncoated clear spectacle lens (sample A) to obtain the transmittance spectra of sample C.

The spectrum labelled "C.State1" corresponds to the UV-VIS absorption spectrum in the deactivated state, i.e., without activation by illumination in the UV-VIS range. Due to the negative photochromism, this deactivated state corresponds to a "dark" or "yellowish" state.

The spectrum labelled "C.State2" corresponds to the UV-VIS absorption spectrum in an activated state, i.e., after illumination in the UV-VIS range. Due to the negative photochromism, this activated state corresponds to a "colorless" state. The "UV edge" at approximately 400 nm is possibly caused by the UV absorption of the coating and the UV absorber contained in the lens.

Table 2 gives an overview of the corresponding L*a*b* values of the L*a*b* color space as well as the parameters "x," "y," and the luminous transmittance "LTM" of sample C.

TABLE 2

Parameters corresponding to the spectra shown in FIG. 4.

| | x | y | L* | a* | b* | LTM |
|---|---|---|---|---|---|---|
| C. State1 | 0.388 | 0.460 | 94.41 | −18.32 | 61.61 | 86.25 |
| C. State2 | 0.316 | 0.333 | 95.93 | −0.29 | 1.33 | 89.87 |

In the activated state of sample C, the luminous transmittance is 89.87%. In the deactivated state the luminous transmittance is only slightly decreased to 86.25%. The reason for this is the presence of a pronounced absorption band with an absorption maximum at approximately 460 nm. This is exactly the part of the spectrum which is perceived as blue by human beings. This is why the a* parameter value changes from −0.29 in the activated state (almost colorless on the blue-yellow axis) to −18.32 in the deactivated state (extremely yellow).

Figure 5:
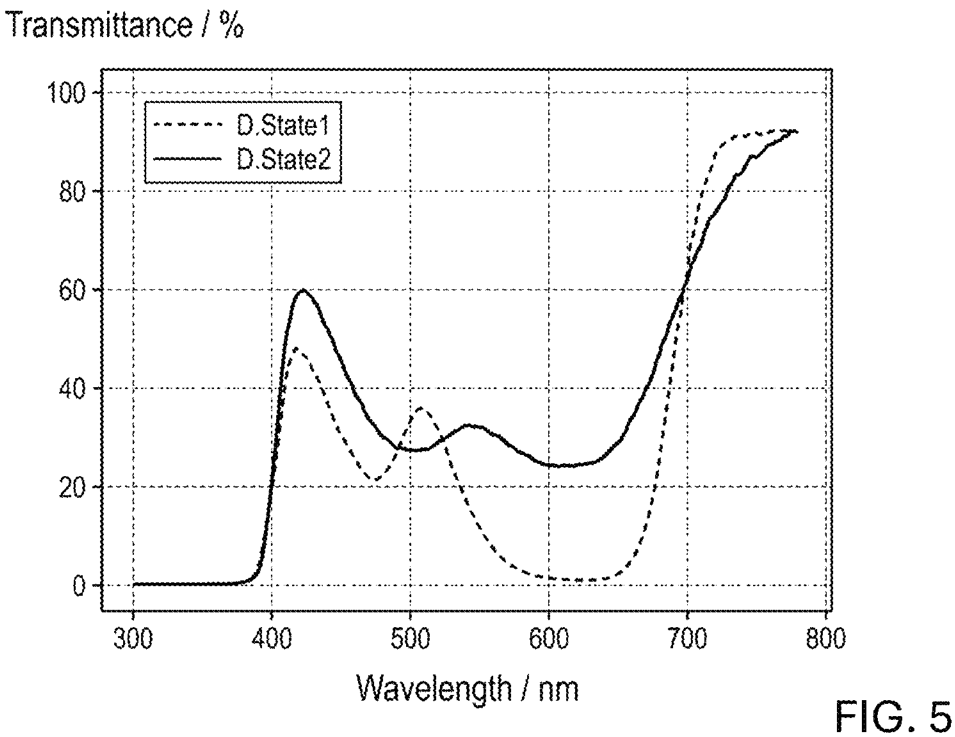
FIG. 5 shows UV-VIS absorption spectra of a photochromic spectacle lens (Sample D) according to a further exemplary embodiment of the disclosure in activated and deactivated state.

FIG. 5 shows simulated UV-VIS absorption spectra of a spectacle lens 1 according to a further exemplary embodiment of the present disclosure, i.e., of a spectacle lens 1 with a coating comprising a composition exhibiting a negative photochromic property 2 (sample D). Here, the composition exhibiting a negative photochromic property 2 is blue cyanine dye with the following chemical formula (2):

(2)

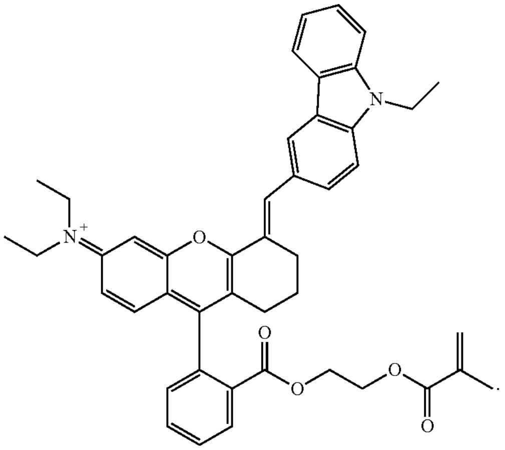

The transmittance spectra of sample D were derived from FIG. 2B in NEMOTO, K. et. al. "Negative photochromism of a blue cyanine dye," Chem.

Commun., 2020, 56, 15205-15207. The disclosed spectra were scaled back at 300 nm and multiplied by the UV-VIS filter spectra of a 2 mm uncoated clear spectacle lens (sample A) to obtain the transmittance spectra of sample D.

The spectrum labelled "D.State1" corresponds to the UV-VIS absorption spectrum in the deactivated state, i.e., without activation by illumination in the UV-VIS range. Due to the negative photochromism, this deactivated state corresponds to a "dark" or "yellowish" state.

The spectrum labelled "D.State2" corresponds to the UV-VIS absorption spectrum in an activated state, i.e., after illumination in the UV-VIS range. Due to the negative photochromism, this activated state corresponds to a "light" or "colorless" state. The "UV edge" at approximately 400 nm is possibly caused by the UV absorption of the coating and the UV absorber contained in the lens.

Table 3 gives an overview of the corresponding L*a*b* values of the L*a*b* color space as well as the parameters "x," "y," and the luminous transmittance "LTM" of sample D.

TABLE 3

Parameters corresponding to the spectra shown in FIG. 5.

| | x | y | L* | a* | b* | LTM |
|---|---|---|---|---|---|---|
| D. State1 | 0.167 | 0.238 | 43.93 | −24.86 | −33.57 | 13.76 |
| D. State2 | 0.277 | 0.275 | 60.84 | 6.79 | −19.66 | 29.09 |

In the deactivated state (state 1), there is a broad absorption maximum from 580 nm to 660 nm. A more sharply defined absorption band is located at 480 nm. In the activated state (state 2), one absorption band is shifted from 480 nm to approximately 500 nm. At the same time, the second absorption band decreases in the range from 580 nm to 660 nm.

During transition from the deactivated to the activated state the following occurs: The luminous transmittance increases from 13.76% to 29.09% and the L* parameter value also increases from 43.93 to 60.84. The a* parameter value increases from −24.86 to 6.79, which corresponds to a color shift from green to red. The b* parameter value changes from −33.57 to −19.66, which corresponds to a color shift from blue to yellow.

Figure 6:
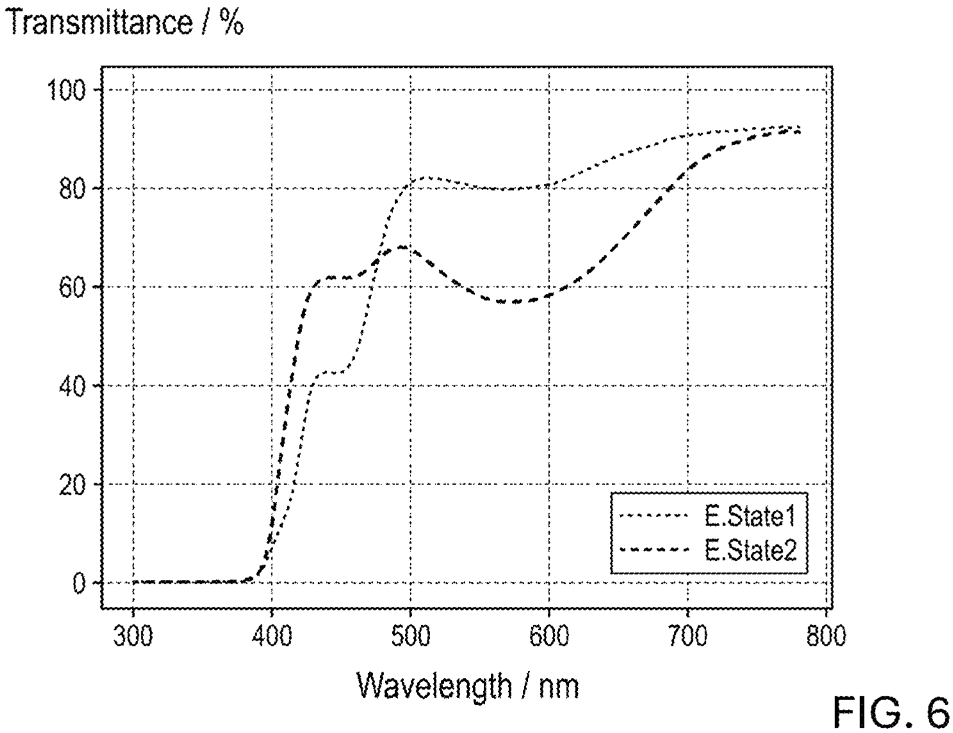
FIG. 6 shows UV-VIS absorption spectra of a photochromic spectacle lens (Sample E) according to a further exemplary embodiment of the disclosure in activated and deactivated state.

FIG. 6 shows simulated UV-VIS absorption spectra of a spectacle lens 1 according to a further exemplary embodiment of the present disclosure (sample E). The spectacle lens 1 (sample E) comprises several coatings comprising a composition exhibiting a negative photochromic property 2 (coating I) and a composition exhibiting a positive photochromic property 8 (coating II) that are arranged on the front surface 7*a* of the spectacle lens substrate 6 laterally adjacent to each other.

The transmittance spectrum was calculated by linear combination:

Transmittance spectrum = (area share coating I * transmittance spectrum spectacle lens with coating I) + (area share coating II * transmittance spectrum spectacle lens with coating II).

For the simulation of the UV-VIS absorption spectra of sample E, an area share of 50% was used for each of the coatings I and II. The transmittance spectra of a spectacle lens 1 with coating I were derived using FIG. 2A left and center in YAMAGUCHI, T. et al. "Fast Negative Photochromism of 1,1'-Binaphthyl-Bridged Phenoxyl-Imidazolyl Radical Complex," J. Am. Chem. Soc. 2016 138 (3), 906-913. The disclosed spectra were multiplied by the UV-VIS filter spectra of a 2 mm uncoated clear spectacle lens (sample A) to obtain the transmittance spectra of a spectacle lens 1 with coating I.

The transmittance spectra of a spectacle lens with coating II are the spectra of sample B, i.e., the grey Zeiss PhotoFusion spectacle lens.

The spectrum labelled "E.State1" corresponds to the UV-VIS absorption spectrum in the almost deactivated state, i.e., without activation by illumination in the UV-VIS range. The spectrum labelled "E.State2" corresponds to the UV-VIS absorption spectrum in an activated state, i.e., after illumination in the UV-VIS range.

Table 4 gives an overview of the corresponding L*a*b* values of the L*a*b* color space as well as the parameters "x," "y," and the luminous transmittance "LTM" of sample E.

TABLE 4

Parameters corresponding to the spectra shown in FIG. 6.

| | x | y | L* | a* | b* | LTM |
|---|---|---|---|---|---|---|
| E. State1 | 0.347 | 0.390 | 91.65 | −10.01 | 26.64 | 79.92 |
| E. State2 | 0.310 | 0.327 | 82.08 | −0.20 | −1.82 | 60.45 |

Upon activation, the luminous transmittance decreases from 79.92% to 60.45%. In addition, the L* parameter value decreases from 91.65 to 82.08. The spectacle lens 1 shows an extreme change concerning the a* and b* parameter values: a* is increased from −10.01 to −0.20 (shift towards red), and b* is decreased from 26.64 to −1.82 (shift towards blue). This means that the luminous transmittance of sample E behaves like a normal photochromic lens when activated. The luminous transmittance therefore decreases upon activation. However, the color shift is much greater because the transmission increases in one wavelength range, i.e., between 380 and 470 nm and decreases in another wavelength range, i.e., between 470 nm and 780 nm.

Figure 7:
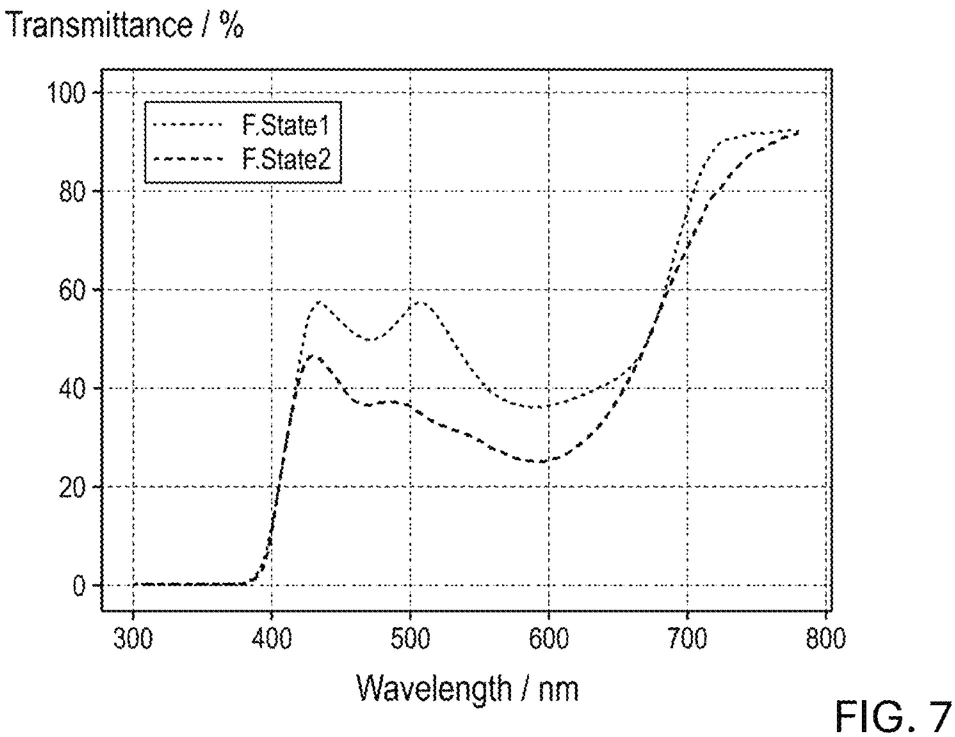
FIG. 7 shows UV-VIS absorption spectra of a photochromic spectacle lens (Sample F) according to a further exemplary embodiment of the disclosure in activated and deactivated state.

FIG. 7 shows simulated UV-VIS absorption spectra of a spectacle lens 1 according to a further exemplary embodiment of the present disclosure (sample F). The spectacle lens 1 (sample F) comprises several coatings comprising a composition exhibiting a negative photochromic property 2 (coating I) and a composition exhibiting a positive photochromic property 8 (coating II) that are arranged on the front surface 7*a* of the spectacle lens substrate 6 laterally adjacent to each other.

The transmittance spectrum was calculated by linear combination:

Transmittance spectrum = (area share coating I * transmittance spectrum spectacle lens with coating I) + (area share coating II * transmittance spectrum spectacle lens with coating II).

For the simulation of the UV-VIS absorption spectra of sample E, an area share of 50% was used for each of the coatings I and II. The transmittance spectra of a spectacle lens 1 with coating I were derived from FIG. 2B in NEMOTO, K. et. al. "Negative photochromism of a blue cyanine dye," Chem. Commun., 2020, 56, 15205-15207. The disclosed spectra were scaled back at 300 nm and multiplied by the UV-VIS filter spectra of a 2 mm uncoated clear spectacle lens (sample A) to obtain the transmittance spectra of a spectacle lens 1 with coating I.

The transmittance spectra of a spectacle lens with coating II are the spectra of sample B, i.e., the grey Zeiss PhotoFusion spectacle lens.

The spectrum labelled "F.State1" corresponds to the UV-VIS absorption spectrum in the almost deactivated state, i.e., without activation by illumination in the UV-VIS range. The spectrum labelled "F.State2" corresponds to the UV-VIS absorption spectrum in an activated state, i.e., after illumination in the UV-VIS range.

Table 5 gives an overview of the corresponding L*a*b* values of the L*a*b* color space as well as the parameters "x," "y," and the luminous transmittance "LTM" of sample F.

TABLE 5

Parameters corresponding to the spectra shown in FIG. 7.

| | x | y | L* | a* | b* | LTM |
|---|---|---|---|---|---|---|
| F. State1 | 0.282 | 0.312 | 72.02 | −6.10 | −9.98 | 43.67 |
| F. State2 | 0.286 | 0.292 | 61.69 | 3.33 | −13.92 | 30.06 |

Upon activation, the luminous transmittance decreases. The L* parameter value also decreases. The a* parameter value increases (shift towards red) and the b* parameter value decreases (shift towards blue). In contrast to sample E, there are no bands here that behave in the opposite way in both states (i.e., one grows, the other shrinks).

Samples D to F demonstrate that the suggested spectacle lenses 1 provide a large variety on modifications of a visual impression of an object observed by a wearer through the spectacle lens 1. For example, color shifts and lightness can be tailored to the specific needs of a wearer or a specific application of the spectacle lens 1 by applying compositions exhibiting a negative photochromic property 2. The additional application of a composition exhibiting a positive photochromic property 8 as in samples E and F allows for further modifications. By varying the proportion of such compositions and/or applying several compositions exhibiting a negative or positive photochromic property 2, 8, further visual effects can be obtained.

Figure 8:
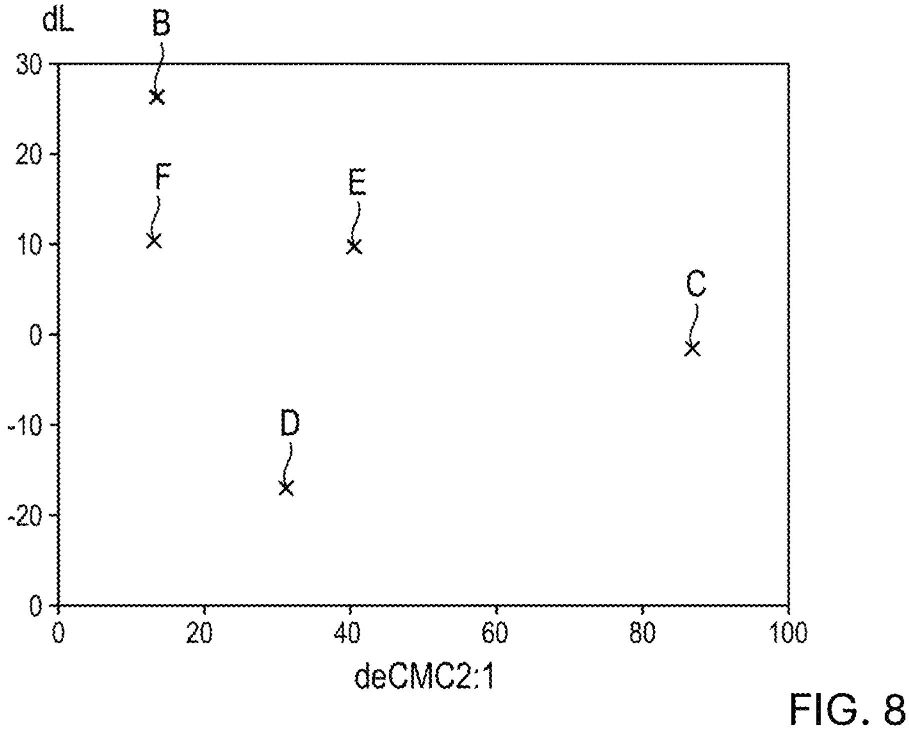
FIG. 8 depicts the relationship between color change and lightness change for spectacle lenses B to F.

FIG. 8 depicts the relationship between color change and lightness change for spectacle lenses of samples B to F. The x axis shows the values for deCMC2:1 that is the color distance between two different spectra based on a formula for determining a quantitative color difference between two spectra perceived by the human eye (for more details please see the url www.brucelindbloom.com/index.html?Eqn_DeltaE_CMC.html, last accessed on Sep. 9, 2021). The y axis shows the values for dL which is the difference in lightness (L* parameter values) between the activated and deactivated state of the respective samples.

Sample B which represents the related art changes extremely in lightness with a relatively small color shift. Sample C, on the other hand, hardly changes its lightness, but the color shift (colorless to yellow) is enormous. Sample D shows brightening with a moderate color shift. Sample E shows a large color shift with a small change in lightness.

Figure 9:
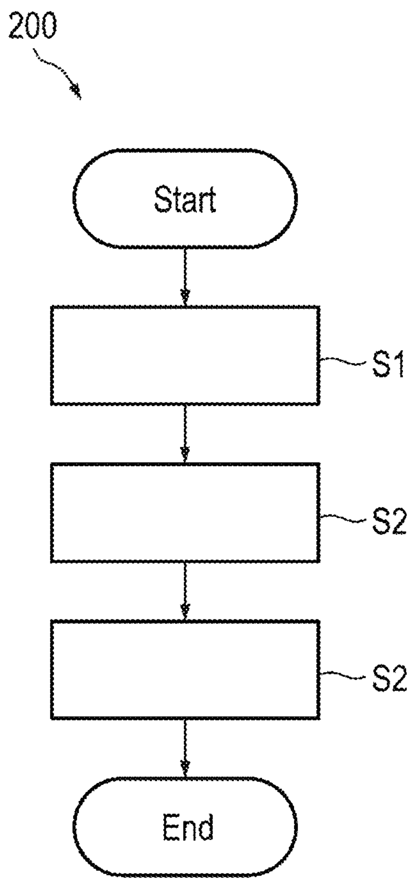
FIG. 9 shows a flowchart illustrating an exemplary embodiment of a method for manufacturing a spectacle lens.

FIG. 9 shows a flowchart of an exemplary embodiment of a method 200 for manufacturing a spectacle lens 1, for example one of the spectacle lenses 1 described with reference to FIGS. 2A to 2E.

In a first method step S1, a spectacle lens substrate 6 is provided. The spectacle lens substrate 6 comprises a polymeric lens material, for example the lens material is poly (allyl diglycol carbonate) or poly(thiourethane) with refractive indices of 1.50, 1.60, or 1.67. Method 200 does not require any specific coating or material on the surface 7*a*, 7*b* of the spectacle lens substrate 6. However, the surface 7*a*, 7*b* might be cleaned prior to the next method steps by common cleaning methods.

If required, the spectacle lens substrate 6 may comprise a dye substance 9 which can be incorporated into the polymeric lens material by conventional tinting processes, e.g., by immersing the spectacle lens substrate 6 in a tinting bath.

In method steps S2 and S3, a composition exhibiting a negative photochromic property 2 and a composition exhibiting a positive photochromic property 8, respectively, are arranged on a surface 7, e.g., the front surface 7*a* of the spectacle lens substrate 6. The composition exhibiting the negative photochromic property 2 comprises a negative photochromic substance 3, and the composition exhibiting the positive photochromic property 8 comprises a positive photochromic substance 5. Both substances 3, 6 are printed on the front surface 7*a* by inkjet printing, i.e., droplets of both substances 3, 6 or droplets of solutions or dispersions of both substances 3, 6 are deposited on the front surface 7*a* laterally adjacent to each other. Thus, a layer comprising both substances 3, 6 is formed.

If needed, additional layers such as antireflective coatings and/or hard coatings can be arranged on top of the layer comprising the negative photochromic substance 3 and the positive photochromic substance 5.

Alternatively to inkjet printing, the composition exhibiting the negative photochromic property 2 and the composition exhibiting the positive photochromic property 8 may be arranged as individual stacked layers on the front surface 7*a* as shown in FIG. 2D.

Typical features of exemplary embodiments of the disclosure are set forth in the following Clauses:

Clause 1. A spectacle lens, wherein the spectacle lens comprises a composition exhibiting a negative photochromic property and a composition exhibiting a positive photochromic property.

Clause 2. The spectacle lens of clause 1, wherein the composition exhibiting the negative photochromic property comprises at least one negative photochromic substance.

Clause 3. The spectacle lens of clause 1 or 2, wherein the composition exhibiting the negative photochromic property comprises a photosensitive matrix with at least one indicator dye substance.

Clause 4. The spectacle lens of any one of clauses 1 to 3, wherein the spectacle lens comprises a spectacle lens substrate.

Clause 5. The spectacle lens of clause 4, wherein the composition exhibiting the negative photochromic property is arranged on a surface of the spectacle lens substrate.

Clause 6. The spectacle lens of clause 5, wherein the composition exhibiting the negative photochromic property is arranged in direct contact to the surface of the spectacle lens substrate.

Clause 7. The spectacle lens of clause 5 or 6, wherein the surface is at least a front surface of the spectacle lens substrate.

Clause 8. The spectacle lens of any one of clauses 4 to 7, wherein the composition exhibiting the negative photochromic property is incorporated into the spectacle lens substrate.

Clause 9. The spectacle lens of any one of clauses 1 to 8, wherein the composition exhibiting the positive photochromic property comprises at least one positive photochromic substance.

Clause 10. The spectacle lens of any one of clauses 4 to 9, wherein the composition exhibiting the positive photochromic property is arranged on the surface of the spectacle lens substrate.

Clause 11. The spectacle lens of clause 10, wherein the composition exhibiting the negative photochromic property and the composition exhibiting the positive photochromic property are arranged on the surface of the spectacle lens substrate.

Clause 12. The spectacle lens of clause 11, wherein the composition exhibiting the negative photochromic property and the composition exhibiting the positive photochromic property are arranged on the surface of the spectacle lens substrate laterally adjacent to each other.

Clause 13. The spectacle lens of clause 11 or 12, wherein the composition exhibiting the negative photochromic property and the composition exhibiting the positive photochromic property are arranged in direct contact to the surface of the spectacle lens substrate.

Clause 14. The spectacle lens of any one of clauses 10 to 13, wherein the surface is at least a front surface of the spectacle lens substrate.

Clause 15. The spectacle lens of any one of clauses 1 to 11, and 14, wherein the composition exhibiting the negative photochromic property and the composition exhibiting the positive photochromic property are arranged in a stacked layer-by-layer structure.

Clause 16. The spectacle lens of any one of clauses 1 to 15, wherein the composition exhibiting the positive photochromic property is incorporated into the spectacle lens substrate.

Clause 17. The spectacle lens of any one of clauses 1 to 16, wherein the spectacle lens comprises a dye substance.

Clause 18. The spectacle lens of clause 17, wherein the dye substance is a non-protonable dye substance.

Clause 19. The spectacle lens according to any one of the clauses 1 to 18, wherein the composition exhibiting the negative photochromic property is at least one selected from the group consisting of azobenzenes, spiropyran derivatives, dihydropyrenes, Stenhouse salts, imidazolyl radical complex and cyanine dyes, in particular, at least one selected from dihydropyrenes, 1,1'-binaphthyl-bridged phenoxyl-imidazolyl radical complex, and blue cyanine dye.

Clause 20. The use of a spectacle lens of any one of clauses 1 to 19 for dynamic contrast adaption.

Clause 21. A method for manufacturing a spectacle lens, wherein the method comprises the following method steps:

providing a spectacle lens substrate;

arranging a composition exhibiting a negative photochromic property on a surface of the spectacle lens substrate and/or incorporating a composition exhibiting a negative photochromic property into the spectacle lens substrate; and arranging a composition exhibiting a positive photochromic property on a surface of the spectacle lens substrate and/or incorporating a composition exhibiting a positive photochromic property into the spectacle lens substrate.

Clause 22. The method of clause 21, wherein the composition exhibiting the negative photochromic property is arranged on the surface of the spectacle lens substrate.

Clause 23. The method of clause 22, wherein the composition exhibiting the negative photochromic property is arranged in direct contact to the surface of the spectacle lens substrate.

Clause 24. The method of any one of clause 22 or 23, wherein the surface is a front surface of the spectacle lens substrate.

Clause 25. The method of any one of clauses 21 to 24, wherein the composition exhibiting the positive photochromic property is arranged on the surface of the spectacle lens substrate.

Clause 26. The method of clause 25, wherein the composition exhibiting the negative photochromic property and the composition exhibiting the positive photochromic property are arranged on the surface of the spectacle lens substrate.

Clause 27. The method of clause 26, wherein the composition exhibiting the negative photochromic property and the composition exhibiting the positive photochromic property are arranged on the surface of the spectacle lens substrate laterally adjacent to each other.

Clause 28. The method of clause 26 or 27, wherein the composition exhibiting the negative photochromic property and the composition exhibiting the positive photochromic property are arranged in direct contact to the surface of the spectacle lens substrate.

Clause 29. The method of any one of clauses 21 to 28, wherein the composition exhibiting the negative photochromic property and/or the composition exhibiting the positive photochromic property are printed on the surface of the spectacle lens substrate.

Clause 30. The method of clause 29, wherein the composition exhibiting the negative photochromic property and/or the composition exhibiting the positive photochromic property are printed by an inkjet printing process.

Clause 31. The method of any one of clauses 21 to 30, wherein the method comprises the following method steps:

incorporating the composition exhibiting the negative photochromic property and/or the composition exhibiting the positive photochromic property into the spectacle lens substrate.

Clause 32. The method of clause 31, wherein a diffusion process is used for the incorporating step.

Clause 33. The method of clause 32, wherein the spectacle lens substrate is immersed into a bath comprising the composition exhibiting the negative photochromic substance and/or the composition exhibiting the positive photochromic property allowing for diffusion of the composition exhibiting the negative photochromic substance and/or the composition exhibiting the positive photochromic property.

Clause 34. The method of any one of clauses 21 to 33, wherein the method comprises the following method steps:

incorporating a dye substance into the spectacle lens substrate.

Clause 35. The method of any one of clauses 21 to 34, wherein the composition exhibiting the negative photochromic property comprises a photosensitive matrix with at least one indicator dye substance.

Clause 36. A spectacle lens, wherein the spectacle lens comprises a composition exhibiting a negative photochromic property, wherein the composition exhibiting the negative photochromic property comprises a photosensitive matrix with at least one indicator dye substance.

Clause 37. The spectacle lens of clause 36, wherein the composition exhibiting the negative photochromic property comprises at least one negative photochromic substance.

Clause 38. The spectacle lens of clause 36 or clause 37, wherein the spectacle lens comprises a spectacle lens substrate.

Clause 39. The spectacle lens of clause 38, wherein the composition exhibiting the negative photochromic property is arranged on a surface of the spectacle lens substrate.

Clause 40. The spectacle lens of clause 39, wherein the composition exhibiting the negative photochromic property is arranged in direct contact to the surface of the spectacle lens substrate.

Clause 41. The spectacle lens of clause 39 or 40, wherein the surface is at least a front surface of the spectacle lens substrate.

Clause 42. The spectacle lens of any one of clauses 38 to 41, wherein the composition exhibiting the negative photochromic property is incorporated into the spectacle lens substrate.

Clause 43. The spectacle lens of any one of clauses 36 to 42, wherein the spectacle lens comprises a composition exhibiting a positive photochromic property.

Clause 44. The spectacle lens of clause 43, wherein the composition exhibiting the positive photochromic property comprises at least one positive photochromic substance.

Clause 45. The spectacle lens of clause 43 or 44, wherein the composition exhibiting the positive photochromic property is arranged on the surface of the spectacle lens substrate.

Clause 46. The spectacle lens of clause 45, wherein the composition exhibiting the negative photochromic property and the composition exhibiting the positive photochromic property are arranged on the surface of the spectacle lens substrate.

Clause 47. The spectacle lens of clause 46, wherein the composition exhibiting the negative photochromic property and the composition exhibiting the positive photochromic property are arranged on the surface of the spectacle lens substrate laterally adjacent to each other.

Clause 48. The spectacle lens of clause 46 or 47, wherein the composition exhibiting the negative photochromic property and the composition exhibiting the positive photochromic property are arranged in direct contact to the surface of the spectacle lens substrate.

Clause 49. The spectacle lens of any one of clauses 45 to 48, wherein the surface is at least a front surface of the spectacle lens substrate.

Clause 50. The spectacle lens of any one of clauses 43, 44, 45, 46, and 49, wherein the composition exhibiting the negative photochromic property and the composition exhibiting the positive photochromic property are arranged in a stacked layer-by-layer structure.

Clause 51. The spectacle lens of any one of clauses 43 to 50, wherein the composition exhibiting the positive photochromic property is incorporated into the spectacle lens substrate.

Clause 52. The spectacle lens of any one of clauses 36 to 51, wherein the spectacle lens comprises a dye substance.

Clause 53. The spectacle lens of clause 52, wherein the dye substance is a non-protonable dye substance.

Clause 54. The spectacle lens according to any one of the clauses 36 to 53, wherein the composition exhibiting the negative photochromic property is at least one selected from the group consisting of azobenzenes, spiropyran derivatives, dihydropyrenes, Stenhouse salts, imidazolyl radical complex and cyanine dyes, in particular, at least one selected from dihydropyrenes, 1,1'-binaphthyl-bridged phenoxyl-imidazolyl radical complex, and blue cyanine dye.

Clause 55. The use of a spectacle lens of any one of clauses 36 to 54 for dynamic contrast adaption.

Clause 56. A method for manufacturing a spectacle lens, wherein the method comprises the following method steps:

providing a spectacle lens substrate; and arranging a composition exhibiting a negative photochromic property on a surface of the spectacle lens substrate and/or incorporating a composition exhibiting a negative photochromic property into the spectacle lens substrate, wherein the composition exhibiting the negative photochromic property comprises a photosensitive matrix with at least one indicator dye substance.

Clause 57. The method of clause 56, wherein the composition exhibiting the negative photochromic property is arranged on the surface of the spectacle lens substrate.

Clause 58. The method of clause 57, wherein the composition exhibiting the negative photochromic property is arranged in direct contact to the surface of the spectacle lens substrate.

Clause 59. The method of any one of clause 57 or 58, wherein the surface is a front surface of the spectacle lens substrate.

Clause 60. The method of any one of clauses 56 to 59, wherein the method comprises:

arranging a composition exhibiting a positive photochromic property on a surface of the spectacle lens substrate and/or incorporating a composition exhibiting a positive photochromic property into the spectacle lens substrate.

Clause 61. The method of clause 60, wherein the composition exhibiting the positive photochromic property is arranged on the surface of the spectacle lens substrate.

Clause 62. The method of clause 61, wherein the composition exhibiting the negative photochromic property and the composition exhibiting the positive photochromic property are arranged on the surface of the spectacle lens substrate.

Clause 63. The method of clause 62, wherein the composition exhibiting the negative photochromic property and the composition exhibiting the positive photochromic property are arranged on the surface of the spectacle lens substrate laterally adjacent to each other.

Clause 64. The method of clause 62 or 63, wherein the composition exhibiting the negative photochromic property and the composition exhibiting the positive photochromic property are arranged in direct contact to the surface of the spectacle lens substrate.

Clause 65. The method of any one of clauses 56 to 64, wherein the composition exhibiting the negative photochromic property and/or the composition exhibiting the positive photochromic property are printed on the surface of the spectacle lens substrate.

Clause 66. The method of clause 65, wherein the composition exhibiting the negative photochromic property and/or the composition exhibiting the positive photochromic property are printed by an inkjet printing process.

Clause 67. The method of any one of clauses 56 to 66, wherein the method comprises the following method step:

incorporating the composition exhibiting the negative photochromic property and/or the composition exhibiting the positive photochromic property into the spectacle lens substrate.

Clause 68. The method of clause 67, wherein a diffusion process is used for the incorporating step.

Clause 69. The method of clause 68, wherein the spectacle lens substrate is immersed into a bath comprising the composition exhibiting the negative photochromic substance and/or the composition exhibiting the positive photochromic property allowing for diffusion of the composition exhibiting the negative photochromic substance and/or the composition exhibiting the positive photochromic property.

Clause 70. The method of any one of clauses 56 to 69, wherein the method comprises the following method step:

incorporating a dye substance into the spectacle lens substrate.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE NUMERALS

1 spectacle lens
2 composition exhibiting a negative photochromic property
3 negative photochromic substance
4 photosensitive matrix
5 positive photochromic substance
6 spectacle lens substrate
7 surface
**7*a*** front surface
**7*b*** back surface

8 composition exhibiting a positive photochromic property
9 dye substance
10 wearer's eye
11 indicator dye substance
100 spectacles
101 spectacle frame
102 bridge
200 method
S1 providing a spectacle lens substrate
S2 arranging a composition exhibiting a negative photochromic property on a surface of the spectacle lens substrate
S3 arranging a composition exhibiting a positive photochromic property on a surface of the spectacle lens substrate

The invention claimed is:

1. A spectacle lens, wherein the spectacle lens comprises:
- a composition exhibiting a negative photochromic property; and
- a composition exhibiting a positive photochromic property,
- wherein the composition exhibiting the negative photochromic property and the composition exhibiting the positive photochromic property are arranged in a same area of the spectacle lens,
- wherein the composition exhibiting the negative photochromic property changes from a state with lower luminous transmittance to a state with higher luminous transmittance when illuminated with light in the UV and/or VIS range and the composition exhibiting the positive photochromic property changes from a state with higher luminous transmittance to a state with lower luminous transmittance when illuminated with the light in the UV and/or VIS range, and
- wherein the composition exhibiting the negative photochromic property enables a color shift changing an L*a*b* color space such that the a* and b* parameters are changed.

2. The spectacle lens according to claim 1, wherein the composition exhibiting the positive photochromic property comprises at least one positive photochromic substance.

3. The spectacle lens according to claim 1, wherein the composition exhibiting the negative photochromic property and the composition exhibiting the positive photochromic property are arranged on a surface of a spectacle lens substrate laterally adjacent to each other.

4. The spectacle lens according to claim 1, wherein the composition exhibiting the negative photochromic property comprises a photosensitive matrix with at least one indicator dye substance.

5. The spectacle lens according to claim 1, wherein the composition exhibiting the negative photochromic property comprises at least one negative photochromic substance.

6. The spectacle lens according to claim 1, wherein the spectacle lens comprises a spectacle lens substrate, and wherein the composition exhibiting the negative photochromic property is arranged on a surface of the spectacle lens substrate.

7. The spectacle lens according to claim 6, wherein the composition exhibiting the negative photochromic property is arranged on a front surface of the spectacle lens substrate.

8. The spectacle lens according to claim 1, wherein the spectacle lens comprises a spectacle lens substrate, and wherein the composition exhibiting the negative photochromic property is incorporated into the spectacle lens substrate.

9. The spectacle lens according to claim 1, wherein the spectacle lens further comprises a dye substance.

10. The spectacle lens according to claim 1, wherein the composition exhibiting the negative photochromic property is at least one selected from the group consisting of azobenzene, spiropyran derivatives, dihydropyrenes, Stenhouse salts, imidazolyl radical complex, and cyanine dyes.

11. A method for manufacturing a spectacle lens, wherein the method comprises the following method steps:
- S1: providing a spectacle lens substrate;
- S2: arranging, in a same area of the spectacle lens substrate, a composition exhibiting a negative photochromic property on a surface of the spectacle lens substrate and/or incorporating a composition exhibiting a negative photochromic property into the spectacle lens substrate; and
- S3: arranging, in the same area of the spectacle lens substrate, a composition exhibiting a positive photochromic property on the surface of the spectacle lens substrate and/or incorporating a composition exhibiting a positive photochromic property into the spectacle lens substrate,
- wherein the composition exhibiting the negative photochromic property changes from a state with lower luminous transmittance to a state with higher luminous transmittance when illuminated with light in the UV and/or VIS range and the composition exhibiting the positive photochromic property changes from a state with higher luminous transmittance to a state with lower luminous transmittance when illuminated with the light in the UV and/or VIS range, and
- wherein the composition exhibiting the negative photochromic property enables a color shift changing an L*a*b* color space such that the a* and b* parameters are changed.

12. The method according to claim 11, wherein the composition exhibiting the negative photochromic property and the composition exhibiting the positive photochromic property are arranged on the surface of the spectacle lens substrate laterally adjacent to each other.

13. The method according to claim 11, wherein the composition exhibiting the negative photochromic property comprises a photosensitive matrix with at least one indicator dye substance.

14. The method according to claim 11, wherein the composition exhibiting the negative photochromic property and/or the composition exhibiting the positive photochromic property are printed on the surface of the spectacle lens substrate.

15. A spectacle lens, wherein the spectacle lens comprises:
- a composition exhibiting a negative photochromic property; and
- a composition exhibiting a positive photochromic property,
- wherein the composition exhibiting the negative photochromic property and the composition exhibiting the positive photochromic property are arranged side-by-side in an alternating fashion, or wherein the composition exhibiting the negative photochromic property is arranged in a layer on a surface of the spectacle lens and the composition exhibiting the positive photochromic property is arranged in a further layer on the layer with the composition exhibiting the negative photochromic property or vice versa,
- wherein the composition exhibiting the negative photochromic property changes from a state with lower luminous transmittance to a state with higher luminous transmittance when illuminated with light in the UV and/or VIS range and the composition exhibiting the positive photochromic property changes from a state with higher luminous transmittance to a state with lower luminous transmittance when illuminated with the light in the UV and/or VIS range, and wherein the composition exhibiting the negative photochromic property enables a color shift changing an L*a*b* color space such that the a* and b* parameters are changed.

* * * * *